United States Patent
Bahat et al.

(10) Patent No.: US 8,396,845 B2
(45) Date of Patent: Mar. 12, 2013

(54) DATA-TIER APPLICATION COMPONENT

(75) Inventors: Omri Bahat, Seattle, WA (US); Shawn Bice, Sammamish, WA (US); Samer Boshra, Bothell, WA (US); Charlie D. Carson, Bellevue, WA (US); Matt Hollingsworth, Redmond, WA (US); Robert Hutchinson, Snoqualmie, WA (US); Praveen Seshadri, Redmond, WA (US); Ken Van Hyning, Snoqualmie, WA (US); Sameer Verkhedkar, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 463 days.

(21) Appl. No.: 12/239,184

(22) Filed: Sep. 26, 2008

(65) Prior Publication Data

US 2010/0083285 A1    Apr. 1, 2010

(51) Int. Cl.
*G06F 17/30* (2006.01)

(52) U.S. Cl. ................ 707/694; 707/999.102

(58) Field of Classification Search .......... 707/610, 707/694, 737, 999.006, 999.101, 999.003, 707/999.102

See application file for complete search history.

(56) References Cited

U.S. PATENT DOCUMENTS

| | | | |
|---|---|---|---|
| 5,335,346 A | 8/1994 | Fabbio | |
| 6,085,198 A | 7/2000 | Skinner et al. | |
| 6,405,212 B1* | 6/2002 | Samu et al. | 1/1 |
| 6,587,854 B1 | 7/2003 | Guthrie et al. | |
| 6,766,326 B1* | 7/2004 | Cena | 707/808 |
| 6,772,350 B1 | 8/2004 | Belani et al. | |
| 6,957,261 B2 | 10/2005 | Lortz | |
| 6,964,040 B2 | 11/2005 | Osborn | |
| 6,973,460 B1 | 12/2005 | Mitra | |
| 6,996,576 B2 | 2/2006 | Vos et al. | |
| 7,020,655 B2 | 3/2006 | Kagalwala et al. | |
| 7,243,097 B1 | 7/2007 | Agrawal et al. | |
| 7,320,004 B1 | 1/2008 | Deluca et al. | |
| 7,325,003 B2 | 1/2008 | Blackwell | |
| 7,627,671 B1* | 12/2009 | Palma et al. | 709/224 |
| 2002/0156792 A1 | 10/2002 | Gombocz | |
| 2005/0187984 A1 | 8/2005 | Chen | |
| 2005/0193264 A1 | 9/2005 | Khan et al. | |
| 2006/0101462 A1 | 5/2006 | Spears | |
| 2006/0242167 A1 | 10/2006 | Singh | |
| 2007/0256056 A1 | 11/2007 | Stern et al. | |
| 2008/0052265 A1 | 2/2008 | Vos et al. | |
| 2008/0065616 A1 | 3/2008 | Brown | |
| 2008/0091978 A1 | 4/2008 | Brodsky et al. | |
| 2008/0155641 A1 | 6/2008 | Beavin et al. | |

OTHER PUBLICATIONS

PCT/US2009/057042 International Search Report, dated Mar. 29, 2010, 3 pages.
PCT/US2009/057050 International Search Report, dated Mar. 31, 2010, 3 pages.
Crocker, et al., "Designing Data Tier Components and Passing Data through Tiers", Date: Aug. 2002, http://msdn.microsoft.com/en-us/library/ms978496.aspx.

(Continued)

*Primary Examiner* — Marc Filipczyk
(74) *Attorney, Agent, or Firm* — Merchant & Gould P.C.

(57) ABSTRACT

Data-tier application components (DACs) and methods for managing database applications are disclosed. According to one particular embodiment, a DAC includes a single unit of management that packages metadata related to a database object. The metadata related to the database object includes an identifier of the database object, a database runtime resource identifier of a database runtime resource operable to manipulate the database object, and a policy related to execution of the database runtime resource.

22 Claims, 16 Drawing Sheets

OTHER PUBLICATIONS

"US Department of Education Federal Student Aid", Date: Jun. 11, 2007, Architectural Models Phase I, Application Architectural Model v2, Final with Post Delivery Edits, 39 Pages.

Berenson, et al., "Microsoft SQL Server Query Processor Internals and Architecture", Date: Jan. 2000, http://msdn.microsoft.com/en-us/library/aa226174.aspx.

"Microsoft SQL Server Data Services", Microsoft, Date: 2008, 4 Pages.

Oracle® Database Security Guide, "Using Virtual Private Database to Implement Application Security Policies" retrieved at <http://stanford.edu/dept/itss/docs/oracle/10g/network.101/b10773/apdvpoli.htm>, © 2003, 17 pages.

Lin Qiao et al, "A Framework for Enforcing Application Policies in Database Systems" retrieved at <http://delivery.acm.org/10.1145/1250000/1247597/p981-qiao.pdf?key1=1247597&key2=5653937121&coll=GUIDE&dl=GUIDE&CFID=38812874&CFTOKEN=78189664>, SIGMOD '07, Jun. 12-14, 2007, Beijing, China, 11 pages.

Elisa Bertino et al, "Supporting Multiple Access Control Policies in Database Systems", retrieved at <http://citeseer.ist.psu.edu/cache/papers/cs/9153/http:zSzzSzmercurio.sm.dsi.unimi.itzSz~samaratizSzPaperszSzoklnd96-samarati.pdf/bertino96supporting.pdf>, ACM Transactions on Database Systems, 1996, 14 pages.

\* cited by examiner

DATA-TIER APPLICATION COMPONENT

BACKGROUND

During the lifecycle of an application, including the authoring, installation, and runtime of the application, many different objects are typically created or otherwise associated with the application. For example, programming code, executable code, software resources, and hardware resources may be associated with the application and each of the items may be assigned various file names and file types. Database applications, in addition to being associated with programming code, executable code, and resources, may become associated with additional objects, such as logins, tables, stored procedures, and database policies.

With many objects to track and maintain, it is often difficult and time consuming for a database administrator to effectively manage all of the items associated with a database application through its lifecycle. For example, when a database administrator desires to make changes to the hardware or other items used by the database application, or to add or change database server instances where the database application is installed, the process of making the desired changes can be time consuming and costly. Objects may be coded or otherwise directly linked to hardware resources where they reside or on which they operate and moving such objects to other locations may involve significant reprogramming. The effort involved in moving the objects or creating an additional installation is increased in cases where application objects are stored in multiple locations or when a single database stores objects used by multiple applications.

SUMMARY

In order to achieve high management productivity during the lifecycle stages of a database application, it is helpful to have a grouping abstraction that associates the items that make up or are used by the database application. Without a software grouping abstraction, it is very difficult to identify, conceptualize, move, or reproduce, or otherwise manage a database application. Embodiments disclosed herein associate elements of a database application in a container associated with metadata of a database object that permits a database application, for example, to be moved or reproduced as a whole. The container associates runtime resource identifiers with the database elements that enable changing the hardware or other runtime resources or to select elements of the database application to use different resources without recoding the elements.

In addition, multiple database application containers may be associated with a single grouping or fabric that enables the database application containers to be moved, reproduced, or otherwise managed as a whole. The fabric references the resource identifiers used by the elements of the database applications to enable the management of multiple database applications.

According to a particular embodiment, a computer readable medium stores a data-tier application component (DAC) that includes a single unit of management that packages metadata related to a database object. The metadata related to the database object includes an identifier of the database object, a database runtime resource identifier of a database runtime resource operable to manipulate the database object, and a policy related to execution of the database runtime resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
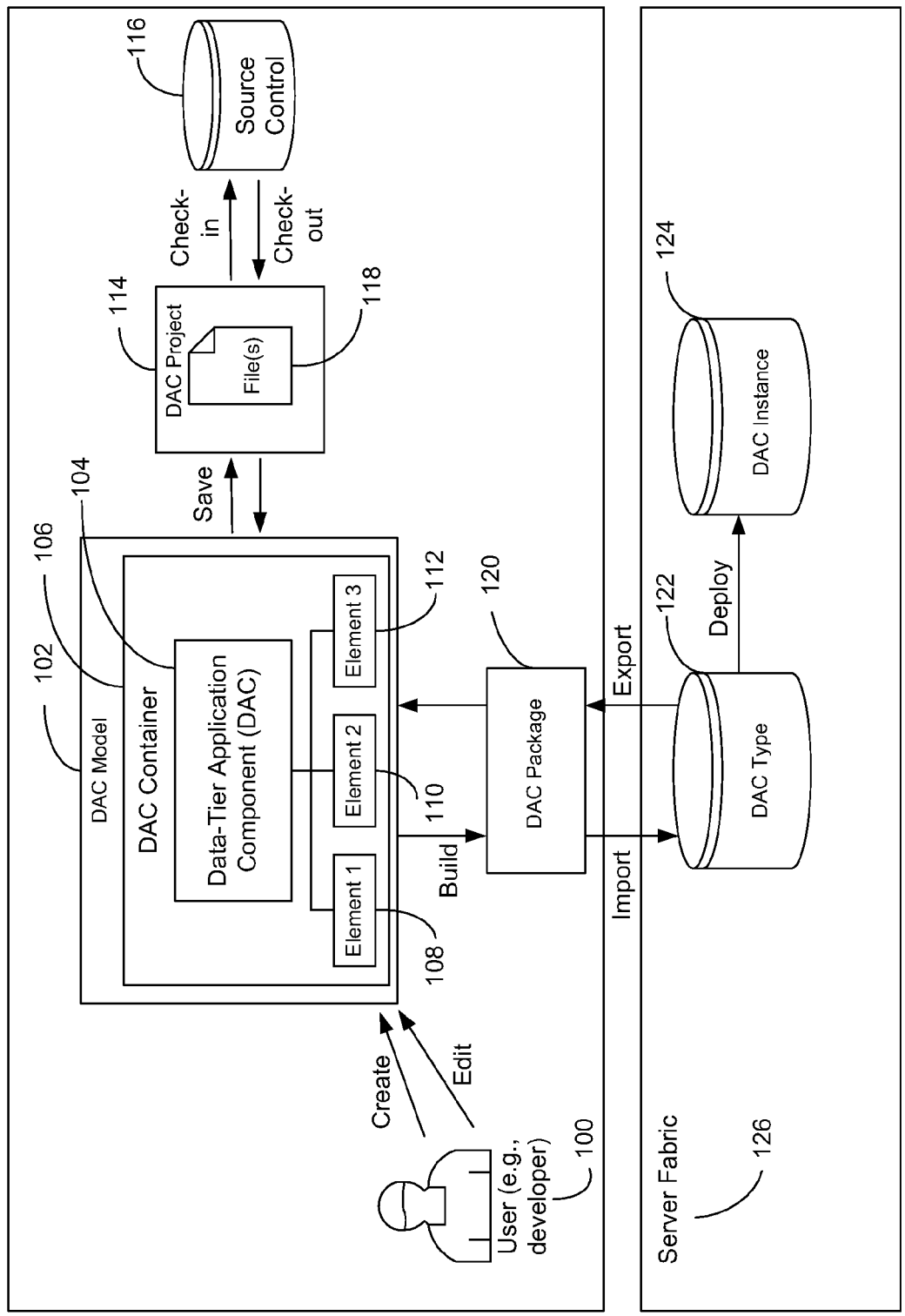
FIG. 1 is a block diagram that illustrates a database development tool that uses a data-tier application component (DAC)

Particular embodiments describe the use of a data-tier application component (DAC) that identifies elements of a database application and provides a single unit of management for the database application. The database application identified by the DAC is associated with a database object identifier and/or metadata of a database object through which the database application can be manipulated. In addition, a database runtime identifier is associated with one or more of the runtime resources used by the elements of the database application. One or more policies related to the execution of the database runtime resources are also identified by the DAC. As a result, the DAC can be referenced by the database object identifier to change, move, or replicate the database application. Similarly, a runtime resource may be changed or the database application may be replicated by changing the database runtime identifier associated with the respective elements. As a result, a database administrator is able to focus on managing content of database applications rather than devoting time and attention to managing organization aspects of instances of database applications.

In a particular embodiment, a data-tier application component (DAC) is disclosed that may be implemented as a computer readable medium. The DAC includes a single unit of management that packages metadata related to a database object. The metadata related to the database object includes an identifier of the database object. The metadata also includes a database runtime resource identifier of a database runtime resource operable to manipulate the database object. The metadata also includes a policy related to execution of the database runtime resource. In addition, it should be understood that the single unit of management described above can include metadata of a plurality of database objects, a plurality of runtime resources, and a plurality of policies related to execution of the database runtime resources. Furthermore, metadata of database objects may include a database object identifier, a schema of the database object (e.g., column schema of a table, text body of a stored procedure and/or function), permissions relating to a database object, and/or other metadata entries that can be used to create or alter an object in a database server and/or reason over a database object.

In another particular embodiment, a computer-implemented system for associating database elements with a set of supporting computer resources is disclosed. The system includes a data-tier application component (DAC) that includes a collection of database elements including metadata related to one or more database objects. The collection of database elements also includes a database runtime resource identifier of a database runtime resource operable to manipulate the database object and a policy related to execution of the database runtime resource. The DAC has a DAC name associated with the collection of database elements. The DAC name is accessible for use by a database application. The collection of database elements is programmably associated with a set of user-selectable supporting computer resources. In a particular embodiment, the supporting computer resources may be changed while the DAC name remains unchanged.

In another particular embodiment, a method of deploying a data-tier application component (DAC) is disclosed. The method includes creating a DAC model. The DAC model includes a collection of database elements including a metadata related to the one or more database objects. The metadata related to one or more database objects includes an identifier of each of the database objects, a database runtime resource identifier of a database runtime resource operable to manipulate the database objects, and a policy related to execution of the database runtime resource. The method includes building a DAC package based on the DAC model and importing a DAC type from the DAC package into a Server Fabric. The method further includes deploying the DAC type to create a deployed DAC instance.

The disclosed subject matter includes a software grouping abstraction that associates the items that make up a database application. The software grouping abstraction enables identification, conceptualization, and management of the database application. The present disclosure includes an abstraction called a Data-tier application component (DAC) that effectively models database objects, policies, and runtime resources associated with the database application.

The DAC forms a single unit of management for the full lifecycle of an application, including versioning. For example, a Human Resources (HR) DAC may be developed in conjunction with the HR application code that it supports. As the HR application executables are deployed to application servers, the HR DAC is deployed to instances of Microsoft SQL Server. The HR DAC can then be monitored and managed. For example, when a predicted load on the HR DAC may result in the HR DAC exceeding the capacity of the current server on which the HR DAC is maintained, the HR DAC may be moved to a new server. The move may be accomplished by referencing the database application by the database object identifier associated with the DAC and by changing the database runtime identifier associated with the database elements to reference runtime resources of the new server. DACs can span multiple types of database runtime environments in general, and/or Microsoft SQL Server runtime environments in particular, including instances of Microsoft SQL Server, Microsoft SQL Server databases, Microsoft SQL Server Database Engine, Microsoft SQL Server Analysis Services, Microsoft SQL Server Reporting Services, and database servers and/or database of different vendors and types.

In addition, the present disclosure may provide benefits to managing a database server and/or a Microsoft SQL Server environment as a whole, allowing for more focus on managing DACs and less on managing individual computers, database instances and databases. The present disclosure addresses this through the concept of a "Server Fabric" (also referred to as a "Microsoft SQL Server Fabric"), which models all of an organization's DACs, database server (e.g., Microsoft SQL Server) runtimes, and hardware resources. The Server Fabric provides a unified view of the entities and containers in the DACs, runtimes, and resource layers, and enables more dynamic mappings between entities. The Server Fabric also includes a central management point for declaring and launching management actions, a central policy administrator, and a central reasoning point that contains the models and data used for analysis, such as impact, what-if, or deployment analysis. These declarative, model-driven features allow database administrators and developers to define global management actions that enforce organization rules, ensure DACs are deployed on runtimes that have all features required by the DAC, and allow entities in the Server Fabric to respond to environmental changes with minimal manual intervention.

These self-managing capabilities, driven by greater knowledge of the state of the entities in the Server Fabric, are desired to make developing, deploying, and managing Data-tier application components significantly easier for database administrators and developers. The present disclosure may allow database administrators and developers to be more productive at managing their applications through their life-cycles, giving them more time to incorporate additional data and storage platform technologies into their systems.

The present disclosure shifts the focus toward the database application and away from conventional focus on database instances (e.g., Microsoft SQL Server instances) and computers. The DAC is a new higher level abstraction sitting above both the instances of database applications and the database containers. The DAC includes the set of database entities that form the data layer support for a traditional three-tier application. In modern systems, database applications and system-level application information often spans multiple databases. For example, Microsoft SQL Server system-level application information may be stored in system databases such as "master" and "msdb."

More specifically, the present disclosure models a database application in a container called a DAC. The DAC is a logical representation that pulls together all of the database application artifacts, associated policies, and referenced runtime resources for an application. Each DAC serves as a single unit of management. A policy may be applied against the DAC and a DAC may be moved as a whole. A policy may be used to manifest a developer or a deployment intent of a required or a preferred outcome or consideration. For example, a developer can declare a required intent by specifying a policy that a DAC can only be deployed on a 64-bit runtime.

The Server Fabric models a set of DACs and maps them to the underlying database instance runtimes (e.g., Microsoft SQL Server runtimes, Microsoft SQL Server instances) and to the hardware resources used by the runtimes. The Server Fabric provides a model of all the runtimes and hardware resources that a set of DACs need to function. The Server Fabric also provides centralized management features that simplify actions that are very complicated using other technology. For example, each DAC has one or more well-known names ("endpoint names") that are managed by the Server Fabric. The endpoint names are independent of the hardware resource or instance being used by the DAC. As a result, applications connect using the endpoint names instead of computer and instance names, enabling a DAC to be moved between instances without requiring application changes.

Combining a model of all available DACs, runtimes, and resources with a central management and reasoning capability within the Server Fabric enables several scenarios. For example, the resource usage of all DACs in the Server Fabric may be monitored. As another example, a central reasoning engine may predict the future workloads of the DACs against the resources allocated to their host runtimes. As another example, actions may be taken in response to a predicted resource shortage. For example, a system may dynamically govern the resources available to a runtime and discover a runtime with excess capacity and move a DAC to that runtime in a way that does not impact application connections. A set of tools and capabilities are described to manage DACs through their lifecycle (development, deployment, and management) in the Server Fabric.

In a particular embodiment, the DAC is a single unit of management that packages metadata of a database object, a database runtime resource identifier of a database runtime resource operable to manipulate the database object, and a policy related to execution of the database runtime resource. As illustrated in FIG. 1, different actions can be applied to a DAC depending on its state in the lifecycle.

For example, referring to FIG. 1, a user 100 (e.g., developer) may create a DAC Model 102. The DAC Model 102 includes a data-tier application component (DAC) 104. The DAC 104 may be included in a DAC container 106. The DAC 104 includes a collection of database elements. As shown in FIG. 1, the DAC 104 includes a first element 108, a second element 110, and a third element 112. The first element 108 may include metadata of a database object including a database object identifier. The second element 110 may include a database runtime resource operable to manipulate the database object. The third element 112 may include a policy related to execution of the database runtime resource. During development of the database application represented in the DAC Model 102, the user 100 may create, edit, and validate the DAC Model 102 and save a representation of the DAC Model 102 as a DAC Project 114. The DAC Project 114 may include one or more files 118. The DAC Project 114 then may be checked into and checked out of a source control system or source control database 116 while the database application is under development.

Once the user 100 (e.g., developer) has completed development of the database application represented in the DAC Model 102, the DAC Model 102 is compiled or built into a completed DAC Package 120 based on the DAC Model 102. The DAC Package 120 may be imported into a Server Fabric (e.g., Server Fabric 126) as a DAC Type 122 that represents a conceptualized version of the DAC Model 102 that may be reproduced and deployed as desired. The DAC Type 122 may be deployed to create a deployed DAC Instance 124 which represents an operational installation of the database application developed as the DAC Model 102. Thus, developing a DAC Model 102, the developer has created a portable database application that may be replicated without recoding the database application. The developer may also configure the DAC Type 122 before deploying the DAC Instance 124. Further, the DAC Instance 124 may be installed with respect to a specific set of physical computing resources.

Figure 2:
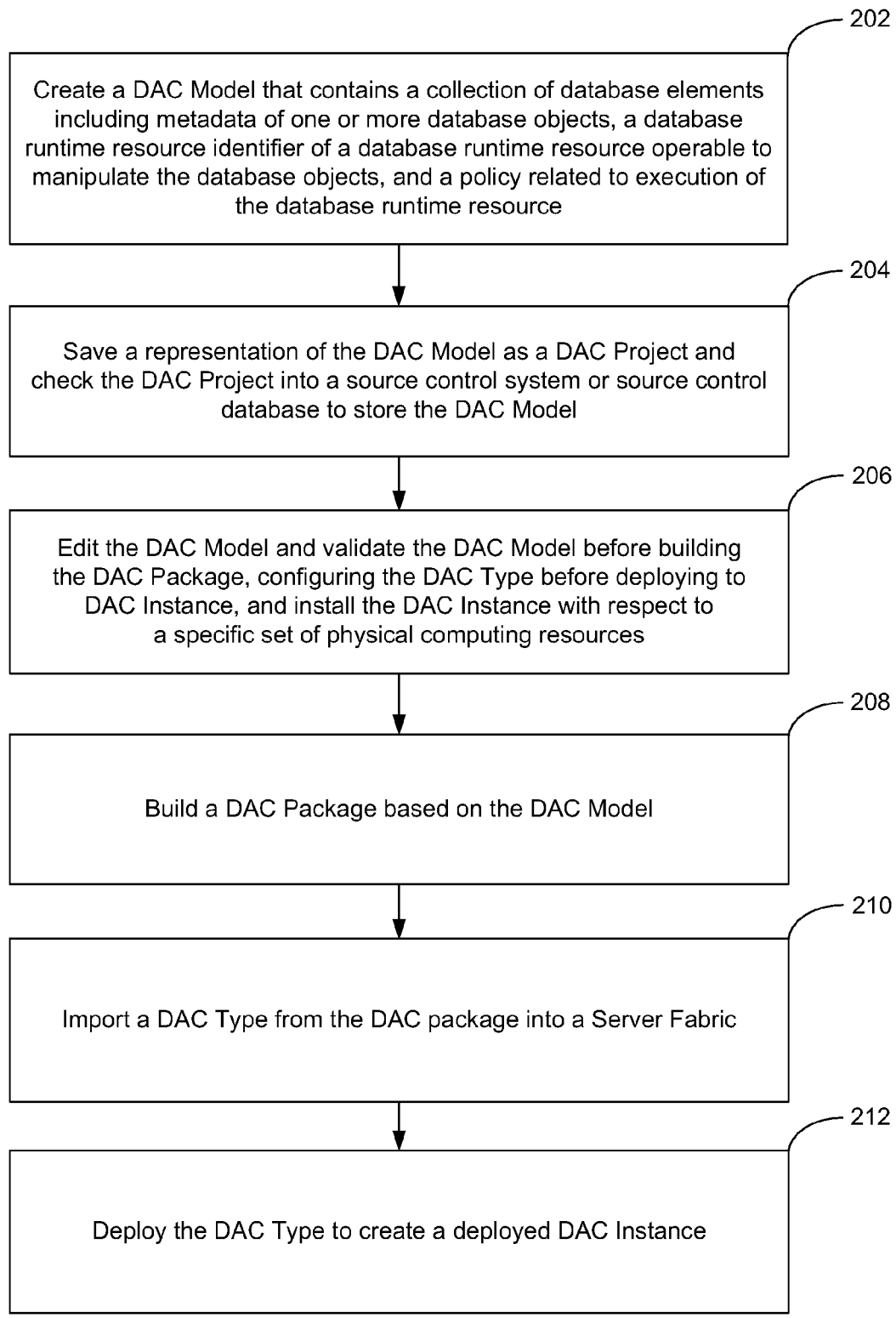
FIG. 2 is a flow diagram that illustrates a method of using a DAC and a DAC package to install a DAC instance.

Referring to FIG. 2, a flow diagram of a particular method of deploying a data-tier application component is illustrated. The method includes, at 202, creating a DAC Model that contains a collection of database elements including metadata of one or more database objects. The DAC Model further includes a database runtime resource identifier of a database runtime resource operable to manipulate the database objects. The DAC Model further includes a policy related to execution of the database runtime resource. In a particular embodiment, at 204, the method includes saving a representation of the DAC Model as a DAC Project and optionally checking in the DAC Project into a source control system or source control database to store the DAC Project. In another particular embodiment, at 206, the method includes editing the DAC Model and validating the DAC Model before building the DAC Package, configuring the DAC Type before deploying the DAC Instance, and installing the DAC Instance with respect to a specific set of physical computing resources. Moving to 208, the method includes building a DAC Package based on the DAC Model. Moving to 210, the method includes importing a DAC Type from the DAC Package into a Server Fabric. Moving to 212, the method includes deploying the DAC Type to create a deployed DAC instance.

It should be emphasized that a DAC has two main subdivisions in the Server Fabric between the DAC Type and the DAC Instance. The DAC Type is built when the DAC is imported to the Server Fabric. The DAC Type defines the logical implementation of the objects in the DAC, such as tables and cubes, and includes policies that define how the developer intends for the DAC to be used. The DAC Instance is built when the DAC Type is deployed to one or more database server runtimes (e.g., Microsoft SQL Server runtimes) in the Server Fabric. The DAC Instance records how the entities in the DAC Type map to their hosts in the Server Runtimes Layer. The DAC Instance includes policies that define how the administrators intend for the DAC to operate in the Server Fabric.

Figure 3:
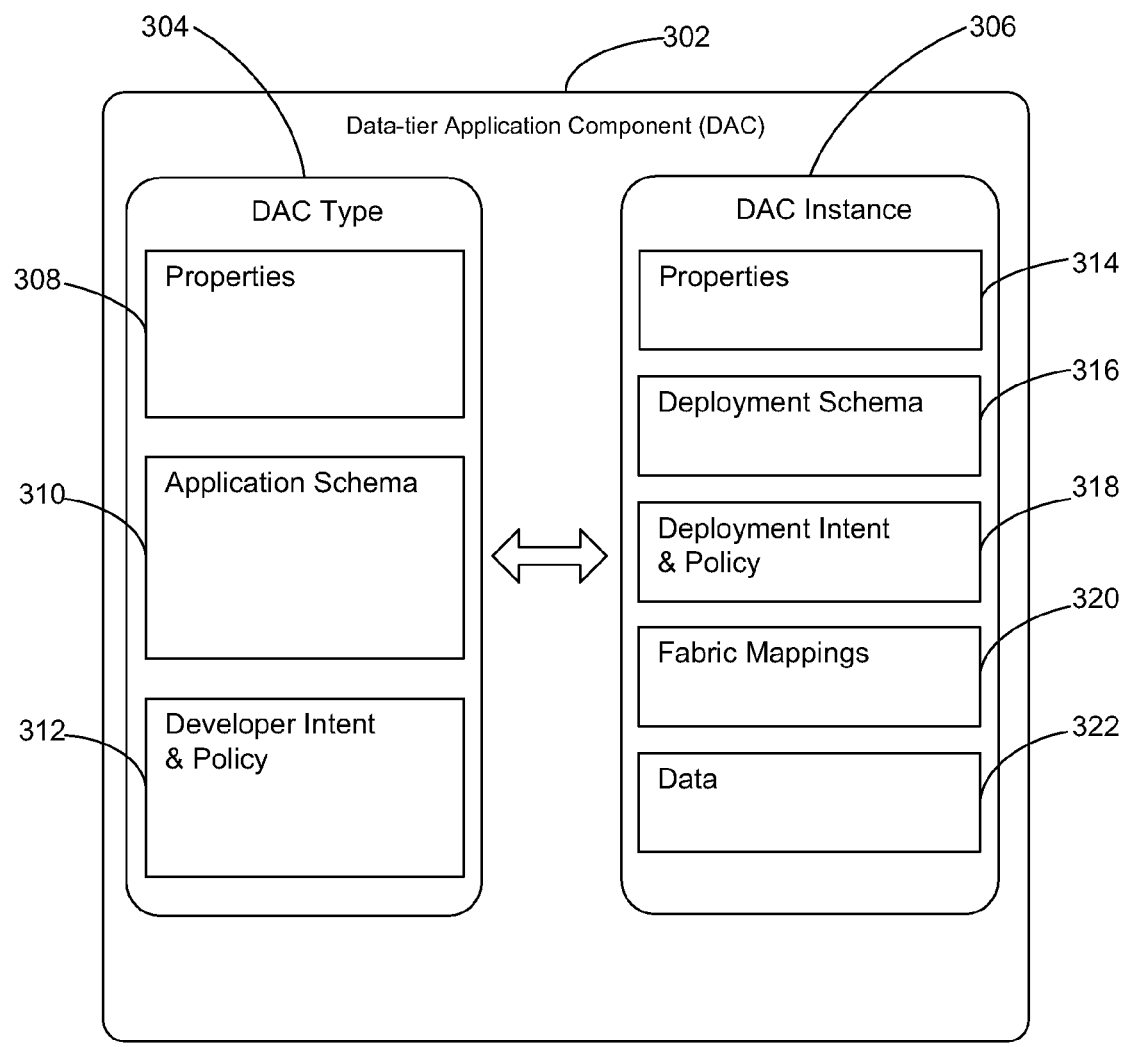
FIG. 3 is a general diagram that illustrates a particular embodiment of a DAC.

Referring to FIG. 3, a high-level view of the contents of a Data-tier application component (DAC) is illustrated. This diagram illustrates the conceptual separation of developer intent (DAC Type) from deployment intent (DAC Instance). As shown in FIG. 3, the DAC may be conceptually divided into a DAC Type 304 and a DAC Instance 306. The DAC Type 304 contains the structure, logic, policies, and other entities that comprise the DAC definition. The DAC Type 304 also provides a mechanism for the developer to formally define the invariants, requirements, and intended usage and interpretation of the DAC 302. The entities that comprise the DAC Type 304 are intended to be managed as a unit. The information is global to all deployments of a specific version of the DAC 302. Thus, the DAC Type 304 may express developer intent, may be versioned, and may be immutable for a particular version, and has an identifier that is guaranteed to be unique. The three main sections of the DAC Type 304 are, for organizational purposes, denoted as Properties 308, Application Schema 310, and Developer Intent and Policy 312.

Properties 308 of the DAC Type 304 are characteristics or attributes specific to the DAC Type 304. For example, a property 308 may include a human-readable name and a description. As a further example, a property 308 may include one or more version identifiers, such as major and minor version numbers. As a further example, a property 308 may include an identifier that is guaranteed to be unique to the DAC Type 304. As a further example, a property 308 may include well-known endpoint names. As a further example, a property 308 may include dependencies on other DAC Types.

The application schema 310 of the DAC Type 304 defines the server and database objects that comprise the DAC 302. The object definitions in this portion of the DAC Type 304 are intrinsic to the DAC 302 and any changes can generate a new version of the DAC Type. The application schema 310 essentially defines "what" the DAC 302 consists of. For example, the application schema 310 may include application structures, such as tables, cubes, and data mining models. As a further example, the application schema 310 may include application logic, such as stored procedures, user-defined functions, and triggers. As a further example, the application schema 310 may include reference data that is considered part of the application definition. For example, lookup data such as zip codes and other postal codes, or state and province codes, may be referenced.

Developer Intent and Policy 312 of the DAC Type 304 provides additional information on how the DAC 302 is intended to be used or interpreted. For example, developer intent and policy 312 may include Server Fabric resource requirements that must be available to deploy the DAC 302. For example, the DAC 302 may require Microsoft SQL Server 2008, enabling support for the spatial data type and CLR Integration, and 80 GB of disk space. As a further example, developer intent and policy 312 may include configuration intent (parameterization) that defines the configurability that is built into the DAC 302. This allows for deployment-specific configuration that does not affect the DAC version, which includes the information that can or must be supplied at deployment time. For example, configuration parameters can indicate that the deployment process must provide mappings to specific types of Server Fabric resources such as file groups and the name of the instance of Microsoft SQL Server. As a further example, developer intent and policy 312 may include an interface definition that specifies which portion of the DAC 302 is exposed externally. This enables separation of the public interface and implementation details that are internal to the DAC 302. For example, the interface definition would specify which entities can be referenced by the client application or another DAC. As a further example, developer intent and policy 312 may include workload profile information, such as the queries that are executed against this DAC 302.

An example of developer intent and policies includes Server Fabric resource requirements that must be available to deploy the DAC. For example, the DAC may require Microsoft SQL Server 2008, enabling support for the spatial data type and CLR Integration, and 80 GB of disk space. Another example of developer intent and policies includes configuration intent (parameterization) that defines the configurability that is built into the DAC. This allows for deployment-specific configuration that does not affect the DAC version, which includes the information that can or must be supplied at deployment time. For example, configuration parameters can indicate that the deployment process must provide mappings to specific types of Server Fabric resources such as file groups and the name of the instance of Microsoft SQL Server. Another example of developer intent and policies includes an interface definition that specifies which portion of the DAC is exposed externally. This enables separation of the public interface and implementation details that are internal to the DAC. For example, the interface definition would specify which entities can be referenced by the client application or another DAC. Another example of developer intent and policies includes workload profile information, such as the queries that are executed against the DAC.

As shown in FIG. 3, the DAC Instance 306 captures actual instance or deployment-specific information. This information is unique to the particular deployment. The DAC Instance 306 expresses deployment intent. The DAC Instance 306 is associated with a DAC Type 304. Multiple DAC Instances can exist for each DAC Type 304. The DAC Instance 306 has an identifier guaranteed to be unique within the Server Fabric. The DAC Instance 306 contains Server Fabric mappings.

Properties 314 of the DAC Instance 306 are characteristics or attributes specific to a deployed instance of the DAC 302. The Properties 314 include items such as the DAC Instance 306 identifier and deployment name.

Deployment Schema 316 of the DAC Instance 306 is the portion of the DAC Instance 306 that defines SQL objects that are specific to a particular deployment. The Deployment Schema 316 includes objects such as principals and indexes.

Deployment Intent and Policy 318 of the DAC Instance 306 provides information on "how" the DAC 302 is intended to be deployed or interpreted. The Deployment Intent and Policy 318 includes items such as intended Server Fabric mappings and intended policies specific to a particular deployment.

Fabric Mappings 320 is the portion of the DAC Instance 306 that defines the mappings between the DAC Instance 306 and the underlying resources. Examples of the contents of Fabric Mappings 320 include Microsoft SQL Server Runtime mappings such as instances or matrices, and hardware resources such as disk storage and computers.

Data 322 is the portion of the DAC Instance 306 that represents the data that is associated with a particular DAC Instance. The Data 322 includes both application data that is created by the user of the application and operational data, such as performance data that is specific to the DAC Instance 306 or to the application.

Figure 4:
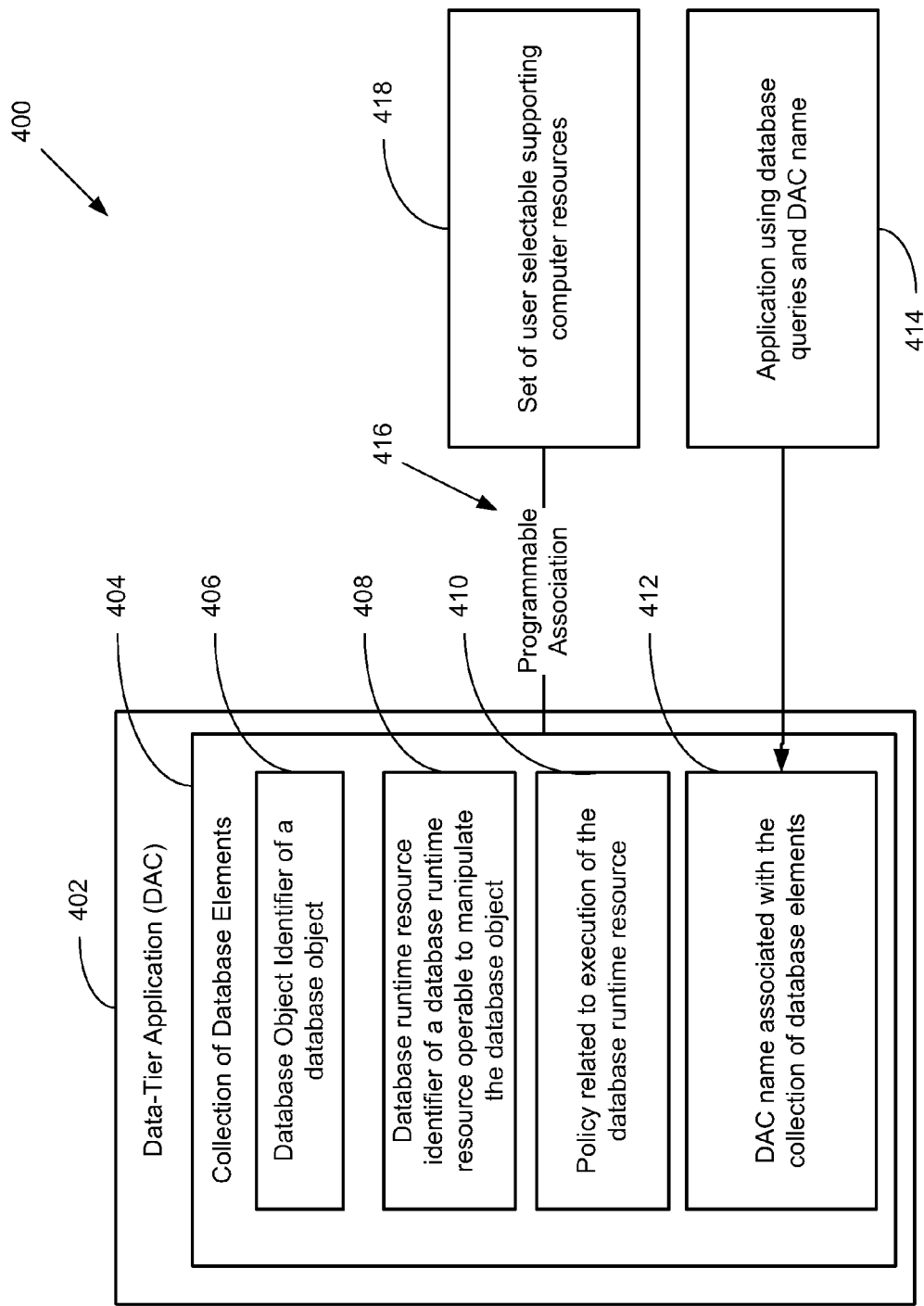
FIG. 4 is a block diagram that illustrates a second embodiment of a DAC that has an associated DAC name.

Referring to FIG. 4, a particular embodiment of a data-tier application component (DAC) is illustrated at 400. The DAC 402 includes a collection of database elements 404. The collection of database elements 404 includes a database object identifier of a database object 406. The collection of database elements 404 also includes a database runtime resource identifier of a database runtime resource operable to manipulate the database object 408. The collection of database elements 404 also includes a policy 410 related to execution of the database runtime resource. The DAC 402 also includes a DAC name 412 associated with the collection of database elements 404. The DAC name 412 is accessible for use by a database application 414. The collection of database elements 404 are programmably associated with, as shown at 416, a set of user-selectable supporting computer resources 418.

The DAC name 412 (e.g., endpoint name) operates somewhat like a Domain Name Service (DNS) name. Application executables connect to the DAC names, not to the specific computer or instance hosting the DAC 402. The association of the DAC 402 with a specific computer or instance is established in the Server Fabric by mapping the DAC 402 to the computer and instance. A DAC 402 can be moved to a new instance without affecting the way that the application connects to a database server (e.g., without affecting connection strings), for example, by simply remapping it to a new instance of Microsoft SQL Server. None of the applications have to be changed; they all still connect to the same DAC name. For example, a DAC with a DAC name of Payroll can be moved from a default instance on Computer1 to another instance on Computer2. Because all applications reference the well-known DAC name Payroll, they still connect to the same DAC 402.

In a particular embodiment, the set of user-selectable supporting computer resources 418 are changeable using an automated tool (e.g., a software application, a user-controlled application, such as Microsoft SQL Server Management Studio, Microsoft Visual Studio, command lines, powershell, etc.). In another particular embodiment, the DAC name 412 associated with the collection is accessible from multiple database applications.

In another particular embodiment, the DAC name 412 is unchanged while the set of user-selectable supporting computer resources 418 is modified.

In another particular embodiment, the DAC name 412 is unchanged while the database elements in the collection of database elements 404 are modified.

In another particular embodiment, the database runtime resource is an instance of Microsoft SQL Server, and the DAC name 412 is unchanged while the instance of Microsoft SQL Server is modified from a first Microsoft SQL Server instance to a second Microsoft SQL Server instance.

In another particular embodiment, the collection of database elements 404 can change or the set of user-selectable supporting computer resources 418 can change, and the DAC name 412 is unchanged so that application connection strings of one or more database applications (e.g., database application 414) do not need to be recoded (e.g., altered, updated, requiring a recompilation of an application, requiring recreation of application binaries and/or executables) when the collection of database elements 404 is changed or when the set of user-selectable supporting computer resources 418 is changed.

In another particular embodiment, the database applications using the DAC name 412 are located on different networked computers.

In another particular embodiment, the policy 410 related to execution of the database runtime resource is applied to the DAC name 412, and the policy 410 continues to be applied when the collection of database elements 404 is changed or when the set of user-selectable supporting computer resources 418 is changed.

In another particular embodiment, the DAC 402 further comprises an application program interface (API) to interface with the collection of database elements 404. For example the API may enable measurement of utilization of elements of the collection of database elements. For example, the API may allow a developer to interface with the collection of database elements 404, as in FIG. 1.

In a particular embodiment, the DAC 402 is stored in a computer readable medium. The computer readable medium may include a single unit of management that packages metadata of a database object, a database runtime resource identifier of a database runtime resource operable to manipulate the database object, and a policy related to execution of the database runtime resource. Although described one at a time, it should be understood that the single unit of management can package metadata of multiple database objects, multiple database runtime resource identifiers of database runtime resources operable to manipulate the database objects, and multiple policies related to execution of the database runtime resources. In addition, the multiple database objects may include a schema, a table, a view, a stored procedure, a function, trigger, a data type, an index, a login, a user, a permission, a policy, statistics, a primary key, a foreign key, a default, a check constraint, and/or any other object that can be created in a database server or a database.

The single unit of management may be mapped to a first physical computing resource. The single unit of management may be remapped from the first physical computing resource to a second physical computing resource. An example of the first physical computing resource is a processor or a memory storage device. In a particular embodiment, the single unit of management is identified by an associated DAC name, where the DAC name is accessible for use by a database application.

The database runtime resource operable to manipulate the database object may be an database instance. The database instance may include an instance of Microsoft SQL Server Database Engine, an instance of Microsoft SQL Server Analysis Services, or an instance of SQL Reporting Services, or instances of other database server types and vendors.

The policy may be related to execution of the database runtime resource including a resource limitation policy or a procedure related to software or hardware resource requirements.

Figure 5:
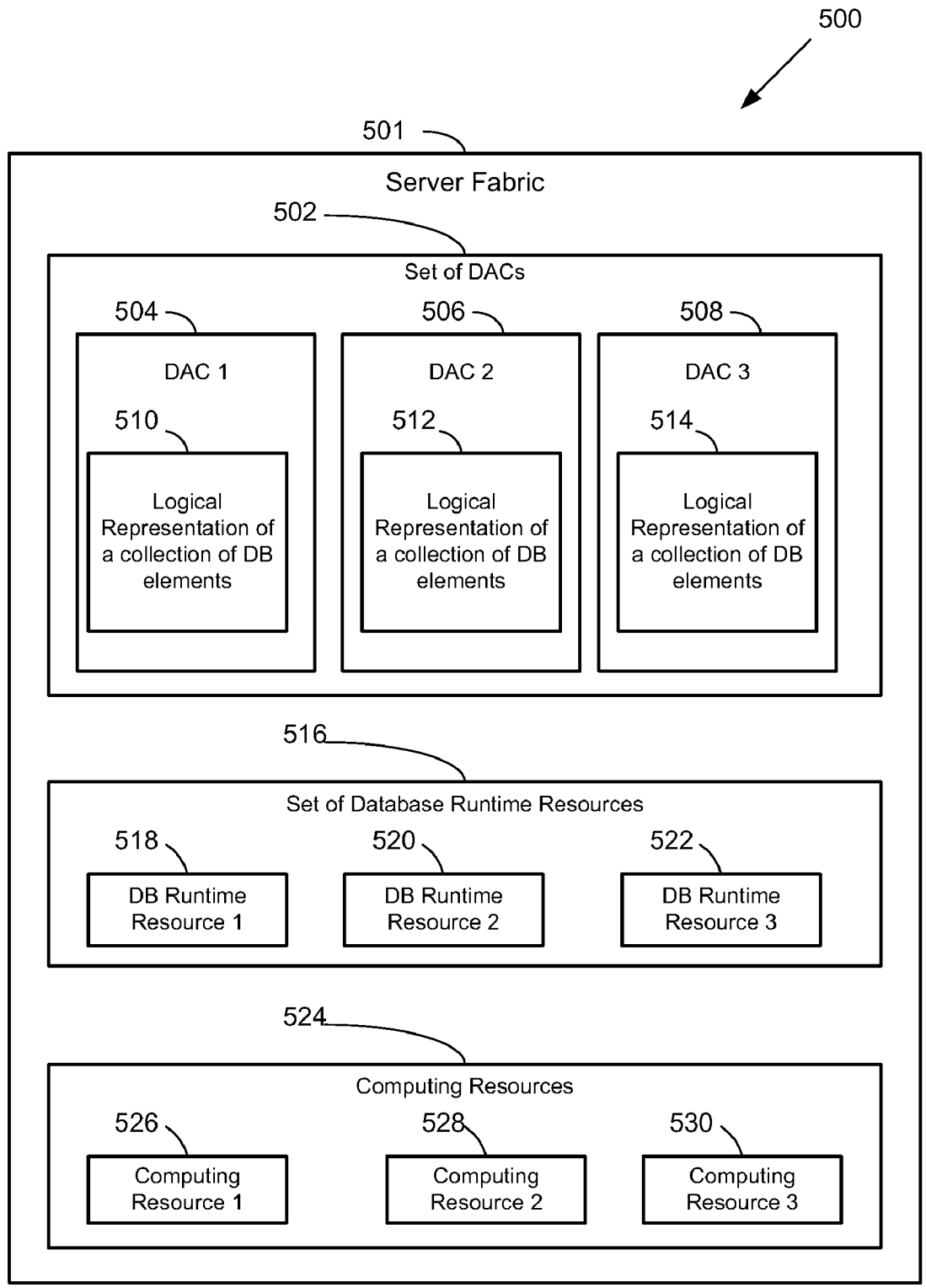
FIG. 5 is a block diagram that illustrates a particular embodiment of a Server Fabric that includes a set of DACs.

Referring to FIG. 5, a particular embodiment of a system is illustrated at 500. The system 500 includes a set of DACs 502. In the embodiment shown in FIG. 5, a first DAC 504, a second DAC 506, and a third DAC 508 are included in the set of DACs 502. Alternatively, the set of DACs 502 may include any number of DACs. Each of the DACs 504, 506, and 508 includes a logical representation of a collection of database elements 510, 512, and 514.

The system 500 further includes a set of database runtime resources 516 hosting the set of DACs 502. In the embodiment shown in FIG. 5, the set of database runtime resources 516 includes a first database runtime resource 518, a second database runtime resource 520, and a third database runtime resource 522. Alternatively, the set of database runtime resources 516 may include any number of database runtime resources.

The system 500 further includes computing resources 524 used by the set of database runtime resources 516 to host the set of DACs 502. In the embodiment shown in FIG. 5, the computing resources 524 include a first computing resource 526, a second computing resource 528, and a third computing resource 530. Alternatively, the computing resources 524 may include any number of computing resources.

The computing resources 524 may include one or more computer server resources, one or more computer data storage resources, or one or more virtual machine resources. Each of the one or more computer server resources may include a processor, a memory, or a network element. At least one of the one or more computer data storage resources may be a storage volume that includes a plurality of files. At least one of the one or more computer server resources may initially be mapped to a first storage area network (SAN) and subsequently be mapped to a second SAN.

In one embodiment, each of the DACs 504, 506, and 508 in the set of DACs 502 include a DAC container. Each DAC container may include a single unit of management that packages metadata of a database object, a database runtime resource identifier of a database runtime resource operable to manipulate the database object, and a policy related to execution of the database runtime resource.

The first DAC 504 in the set of DACs 502 may be dependent on the second DAC 506 in the set of DACs 502.

Each of the DACs 504, 506, and 508 in the set of DACs 502 may be represented by a DACs layer of a Server Fabric 501. The computing resources 524, including the computing resources 526, 528, and 530, may be represented by a hardware resources layer of the Server Fabric 501. Each of the database runtime resources 518, 520, and 522 in the set of database runtime resources 516 may be represented by a Structured Query Language (SQL) Server runtimes layer of the Server Fabric 501.

The set of database runtime resources 516 may include one or more runtime instances that provide Microsoft SQL Server services. The one or more runtime instances may include one or more instances of Microsoft SQL Server, Microsoft SQL Server Analysis Services, and Microsoft SQL Server Reporting Services. Further, the one or more Microsoft SQL Server runtime instances may include schemas and views.

Each of the DACs 504, 506, and 508 may be mapped to one of the database runtime resources 518, 520, and 522 and each database runtime resource 518, 520, and 522 may be mapped to one or more physical computing resources 526, 528, and 530. The database runtime resources may be remapped from a first computer to a second computer.

Each of the DACs 504, 506, and 508 may include an associated DAC name. The DAC name may be accessible for use by a database application.

Figure 6:
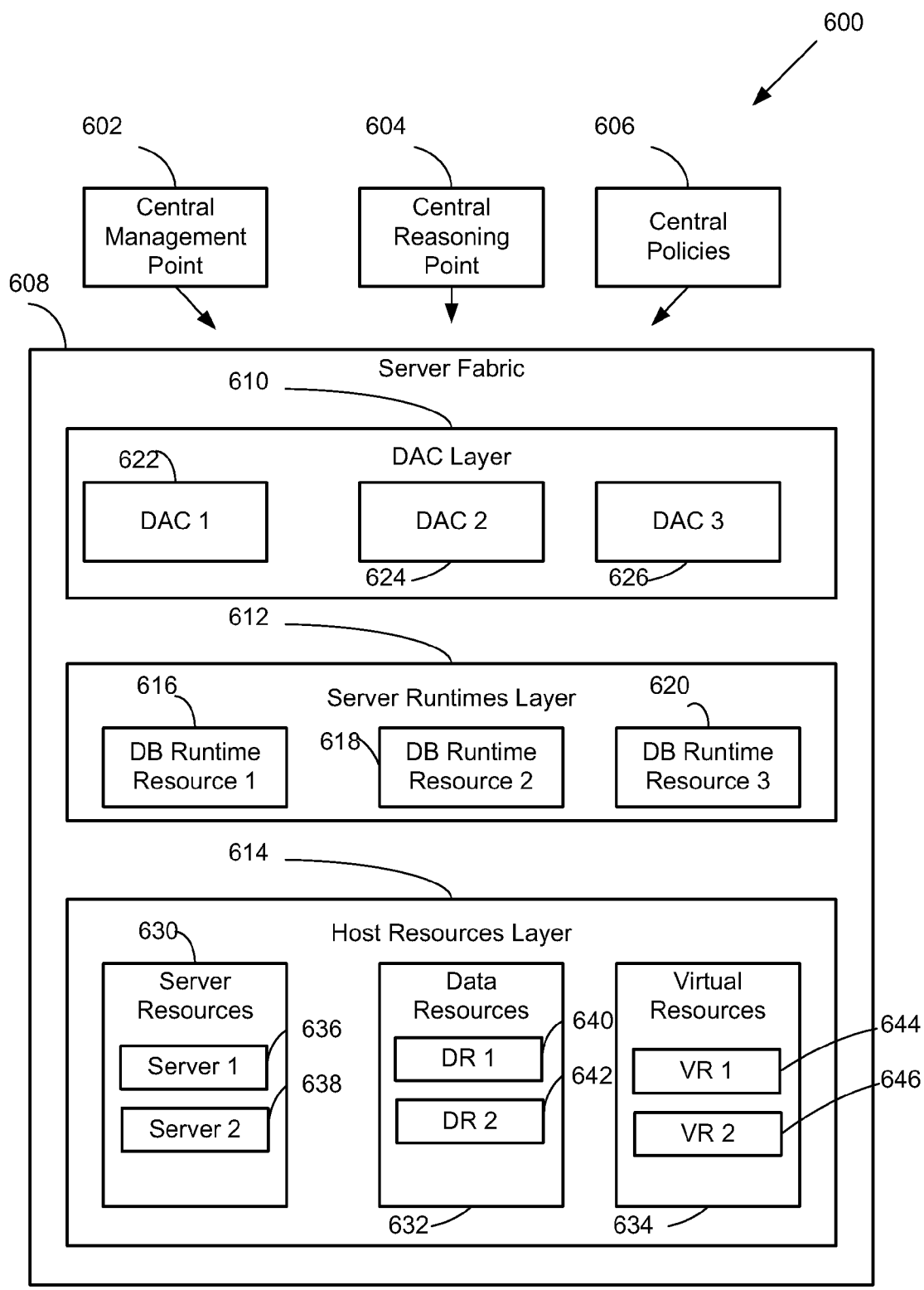
FIG. 6 is a block diagram that illustrates a second embodiment of a Server Fabric that includes a set of DACs.

Referring to FIG. 6, a block diagram that illustrates a second embodiment of a Server Fabric that includes a set of DACs is shown at 600. The Server Fabric 608 is a model-based representation of a set of DACs (DACs), the Microsoft SQL Server runtimes hosting the DACs, and the resources used by those runtimes to host the DACs. The Server Fabric model has three layers as shown in FIG. 6: the DACs layer 610, the Server Runtimes Layer 612, and the Host Resources layer 614. All of the objects within the model are described using a set of general modeling concepts (nouns), and have a series of actions (verbs) that can be performed on those objects.

The DACs layer 610 hosts the Server Fabric definitions of DACs. In the embodiment shown, the DACs layer 610 includes a first DAC 622, a second DAC 624, and a third DAC 626. Alternatively, the DACs layer 610 may include any number of DACs. The Server Runtimes Layer 612 provides a view of the database runtime resources (e.g., Microsoft SQL Server services) within the Server Fabric 608. In the embodiment shown, the Server Runtimes Layer 612 includes a first database runtime resource 616, a second database runtime resource 618, and a third database runtime resource 620. Alternatively, the Server Runtimes Layer 612 may include any number of database runtime resources. The Host Resources layer 614 represents the computing and storage capacity used by the elements in the Server Fabric 608. In the embodiment shown, the Host Resources layer 614 includes server resources 630, including a first server 636 and a second server 638. Further, the Host Resources layer 614 includes data resources 632, including a first storage resource 640 and a second storage resource 642. Further, the Host Resources layer 614 includes virtual resources 634, including a first virtual resource 644 and a second virtual resource 646. Alternatively, the Host Resources layer 614 may include any number of server resources, data resources, or virtual resources.

The Server Fabric 608 identifies DACs, database runtime resources hosting the set of DACs, and computing resources used by the database runtime resources to host the DACs. Each of the DACs 610 includes a logical representation of a collection of database elements. The central reasoning point 604 monitors entities of the Server Fabric 608. Central policies 606 are used to automatically applying the received database management action and the policy at affected entities identified by the Server Fabric 608.

Each layer in the Server Fabric 608 contains four types of entities: containers, elements, resources and mappings. A container is a top-level entity within a given layer of the Server Fabric 608 and provides an intuitive unit of management and identity. Examples of containers include DACs, computers, virtual machines, storage, instances of Microsoft SQL Server, Microsoft SQL Server Analysis Services, and Microsoft SQL Server Reporting Services. An element is a unit in the Server Fabric 608 that resides in a container. For example, tables and stored procedures are elements that reside in a DAC. A resource is a special type of element that has a finite capacity, and has properties which determine its capacity. A processor device is an example of a granular resource, and its clock speed is an example of a property that determines its capacity. A storage device is an example of a resource that contains more granular resources such as physical disks. The capacity of a storage device is determined not only by properties of the physical disks it contains, but also by its configuration properties such as RAID level. A mapping represents the relationship between two parts of the Server Fabric 608. Mappings are the nouns that make the Server Fabric 608 an actual model of the Microsoft SQL Server environment. Mappings can be container-to-container, container-to-element, container-to-resource, element-to-element, element-to-resource, and resource-to-resource.

The makeup of each layer 610, 612, and 614 in the Server Fabric 608 can be defined by applying the general modeling concepts described above. Each layer consists of one or more containers, elements and resources within those containers, and mappings between containers or elements in adjacent layers of the Server Fabric 608.

The DACs layer 610 hosts the Server Fabric definitions of DACs. Each DAC may be defined using a DAC container. Each DAC container is made up of numerous elements representing application entities such as structures, code, version, and policies.

The mappings at the DACs layer 610 describe the relationship between a DAC and a Microsoft SQL Server runtime (e.g., an instance of Microsoft SQL Server). For example, a DAC in the DACs layer 610 can be mapped to an instance of Microsoft SQL Server in the Server Runtimes Layer 612. The DAC can then be moved from one instance to another by re-mapping the DAC between the instances. As an example, the first DAC 622 may be mapped to the first database runtime resource 616 (e.g., a first instance of Microsoft SQL Server), and the first DAC 622 can then be moved to the second database runtime resource 618 (e.g., a second instance of Microsoft SQL Server) by re-mapping the first DAC 622 to the second database runtime resource 618.

The mappings can also describe relationships between DACs. A DAC can express a dependency on another DAC in order to allow re-use of common elements. For example, a "base" DAC can be defined that has elements shared by several applications, such as a set of stored procedures that enforce company policies for ordering supplies. Any other DAC needing those elements can reference them by mapping to the "base" DAC. For example, the first DAC 622 may be dependent on the second DAC 624.

The Server Runtimes Layer 612 provides a view of the Microsoft SQL Server services within the Server Fabric. Microsoft SQL Server Runtimes containers include instances of Microsoft SQL Server, Microsoft SQL Server Analysis Services, and Microsoft SQL Server Reporting Services. Each runtime container has one or more database elements. Database elements may include schemas, tables, views, stored procedures, functions, data types, indexes, logins, users, policies, statistics, primary key, foreign key, default, check constraint, and/or any other objects that can be created in a database server or a database.

The mappings at the Server Runtimes Layer 612 describe the relationship between a particular database instance runtime (e.g., an instance of Microsoft SQL Server) and the physical resources allocated to it. For example, an instance residing in the Server Runtimes Layer 612 is mapped to a physical computer in the Hardware Resources layer 614. The instance can be moved between physical computers by re-mapping the instance between the computers. As an example, the first database resource 616 can be mapped to the first server 636, and the first database resource 616 can be moved to the second server 638 by re-mapping the first database resource 616 from the first server 636 to the second server 638.

The Host Resources layer 614 represents the computing and storage capacity used by the elements in the Server Fabric 608. Containers at the Host Resources layer 614 include physical computers, virtual machines, and operating system storage volumes. Resource containers can also contain sub-elements. For example, physical servers contain processor, memory, and network elements. Operating system storage volumes may contain file elements as well as other elements relating to storing the mentioned artifacts The mappings at the Host Resources layer 614 describe the relationships between the physical resources. For example, a Host Resources layer mapping expresses which SAN Logical Unit Numbers (LUNs) are accessible from each physical server. The SAN LUN could be moved between physical servers by changing the mapping between the physical servers and the SAN LUN.

The Server Fabric 608 supports the central declaration of management actions and policies that can be applied to entities throughout the Server Fabric 608. A central management point 602 of the Server Fabric 608 may receive a database management action and a policy. The Server Fabric 608 also provides a reasoning engine that can monitor Server Fabric entities and automatically apply management actions and policies. The central management mechanisms of the Server Fabric 608 are illustrated in FIG. 6.

The central management mechanisms all reference a model that records the relevant details, relationships, and constraints of the containers in the Server Fabric 608.

One of the instances of Microsoft SQL Server in the Server Fabric 608 may be nominated as the Central Management Point 602, and provides centralized management capabilities (such as discovery, policy definition, and monitoring) for all the Server Fabric layers. The central management point 602 is where all container actions are triggered (e.g., import, move, create, and deploy). The central management point 602 may be hosted at one of the database runtime resources identified by the Server Fabric 608. For example, the central management point 602 may be hosted at a first database runtime resource 616, a second database runtime resource 618, or a third database runtime resource 620. The central management point 602 may provide discovery, policy definition, and monitoring for Server Fabric layers 610, 612, and 614.

The Central Reasoning Point 604 supplies the data model of the elements in the Server Fabric 608. The model is used by analysis engines for predicting resource usage trends and the impacts of possible actions across the Server Fabric 608. The central reasoning point 604 may be used to take central reasoning actions on entities identified by the Server Fabric 608. The central reasoning actions may include a first action that, for example, estimates an impact of uninstalling a first DAC, where other DACs may have dependencies on the first DAC. The central reasoning actions may also include a second action that, for example, estimates an impact on one or more DACs of modifying a memory resource of one of the computing resources. The central reasoning actions may also include a third action that, for example, presents a list of instances of Microsoft SQL Server in the Server Fabric 608 that are configured to host a DAC to be deployed.

The Central Policies 606 may include a policy that is an authoritative principle defined to guide behaviors or actions, and where the policy specifies a set of conditions that can be applied to a set of entities identified by the Server Fabric 608. For example, the set of entities may include one or more Microsoft SQL Server runtime instances and the policy may restrict incorporation of the one or more Microsoft SQL Server runtime instances into the Server Fabric 608 based on a software version of Microsoft SQL Server. As an example, only instances of Microsoft SQL Server 2008 can be incorporated into the Server Runtimes Layer 612. As a further example, the set of entities may include one or more computing resources, and the policy may restrict incorporation of the one or more computing resources into the Server Fabric 608 based on an operating system or an amount of memory. As an example, only servers with a 64-bit version of Windows Server 2008 and at least four gigabytes (4 GB) of memory can be incorporated into the Host Resources layer 614.

The central management point 602 may trigger Server Fabric actions. For example, the Server Fabric actions may include an import action, an export action, a deploy action, a copy action, a validate action, an install action, an uninstall action, an add action, a remove action, a get action, a set action, an enumerate action, a move action, a create action, a save action, an upgrade action, a start action, a stop action, a restart action, a run action, a suspend action, a resume action, a disable action, an enable action, a measure action, a monitor action, a predict action, a govern action, a map action, an unmap action, a discover action, a compare action, a merge action, a block action, an unblock action, a grant action, or a revoke action.

Lifecycle verbs describe the set of actions for managing entities from the time of creation or importation into the Server Fabric 608 to the time or removal from the Server Fabric 608. For example, lifecycle verbs cover actions like creation, modification, and deletion of a given entity. Some lifecycle verbs may apply to one or more of the layers 610, 612, and 614. The lifecycle verbs include import action, an export action, a deploy action, a copy action, a validate action, an install action, an uninstall action, an add action, a remove action, a get action, a set action, an enumerate action, a move action, a create action, a save action, and an upgrade action.

The Import action creates a new container and associated elements from an external, persistent data store. The Import action may apply to the DACs layer 610. For example, the Import action may import a DAC from a DAC package file into the Server Fabric 608. The Export action creates a persistent external data store (e.g., a file) from a container and its contained elements. The Export action may apply to the DACs layer 610. For example, the Export action may export a DAC to a file.

The Deploy action places a container and its objects in an intended location. The Deploy action may apply to the DACs layer 610. For example, the Deploy action may deploy a first DAC 622 to an instance in the Server Runtimes Layer 612 (e.g., a first instance 616).

The Copy action copies a set of elements from one container to another container. The Copy action may apply to the DACs layer 610 and the Server Runtimes Layer 612. For example, the Copy action may copy a database from one instance of Microsoft SQL Server to another instance in the Server Runtimes Layer 612 (e.g., from the first instance 616 to a second instance 618).

The Validate action checks if a target container, element, resource, or mapping complies with a specified criterion. The Validate action may apply to the DACs layer 610, the Server Runtimes Layer 612, and the Host Resources Layer 614. For example, the Validate action may validate that an instance of Microsoft SQL Server has CLR Integration enabled.

The Install action configures a DAC to be operational in the Server Fabric 608. The Install action may apply to the DACs layer 610 and the Server Runtimes Layer 612. For example, the Install action may install the DAC on the first instance 616. The Uninstall action removes a container and its elements from the specified location. The Uninstall action may apply to the DACs layer 610 and the Server Runtimes Layer 612. For example, the Uninstall action may uninstall the DAC from the first instance 616.

The Add action incorporates a representation of an externally created container, element, or resource into the Server Fabric. The Add action may apply to the Server Runtimes Layer 612 and Host Resources layer 614. For example, the Add action may add first Microsoft SQL Server instance 616 to the Server Runtimes Layer 612. The Remove action disassociates an externally created container, element, or resource from the Server Fabric 608. The Remove action may apply to the Server Runtimes Layer 612 and the Host Resources layer 614. For example, the Remove action may remove the Microsoft SQL Server instance 616 from the Server Runtimes Layer 612.

The Get action retrieves the current configuration of a container, element, resource, or mapping. The Get action may apply to the DACs layer 610, the Server Runtimes Layer 612, and the Host Resources Layer 614. For example, the Get action may get the version number of the DAC installed on the first Microsoft SQL Server instance 616.

The Set action updates the current configuration of a container, element, resource, or mapping. The Set action may apply to the DACs layer 610, the Server Runtimes Layer 612, and the Host Resources Layer 614. For example, the Set action may set the version number of the DAC installed on the first Microsoft SQL Server instance 616.

The Enumerate action gets a set of elements or resources within a container. The Enumerate action may apply to the DACs layer 610, the Server Runtimes Layer 612, and the Host Resources Layer 614. For example, the Enumerate action may enumerate the resources on the first server 636.

The Move action moves a set of elements or resources from one container, element, or resource to another. The Move action may apply to the DACs layer 610, the Server Runtimes Layer 612, and the Host Resources Layer 614. For example, the Move action may move a database from one instance of Microsoft SQL Server to another instance in the Server Runtimes Layer 612.

The Create action creates a new container or element. The Create action may apply to the DACs layer 610 and the Server Runtimes Layer 612. For example, the Create action may create a new policy constraint which specifies that the DAC requires Microsoft Microsoft SQL Server 2008.

The Save action persists the current configuration of a container, element, resource, or mapping. The Save action may apply to the DACs layer 610, the Server Runtimes Layer 612, and the Host Resources Layer 614. For example, the Save action may save the version number of the DAC installed on the first Microsoft SQL Server instance 616.

The Upgrade action converts an existing configuration of a container or element to a new definition. The Upgrade action may apply to the DACs layer 610 and the Server Runtimes Layer 612. For example, the Upgrade action may upgrade the Orders table definition installed on the first Microsoft SQL Server instance 616 from a first version to a second version.

The Server Fabric 608 has several processes that perform actions such as monitoring performance, reconciling changes, and validating compliance with policies. The following set of verbs may be used to manage the processes. All of the remaining verbs apply to all layers of the Server Fabric 608 (e.g., the DACs layer 610, the Server Runtimes Layer 612, and the Host Resources Layer 614). The process control verbs include a start action, a stop action, a restart action, a run action, a suspend action, a resume action, a disable action, and an enable action.

The Start action initiates a process, which continues to run until stopped. For example, the Start action starts reconciliation on the first Microsoft SQL Server instance 616. The Stop action discontinues a running process. For example, the Stop action may stop reconciliation on the first Microsoft SQL Server instance 616. The Restart action stops a running process, and then starts it again. For example, the Restart action may restart reconciliation on the first Microsoft SQL Server instance 616. The Run action starts a process which executes and stops automatically on completion. For example, the Run action may run discovery on the first Microsoft SQL Server instance 616. The Suspend action pauses a process, the process remains paused until it is resumed. For example, the Suspend action may suspend discovery on the first Microsoft SQL Server instance 616. The Resume action continues a suspended process. For example, the Resume action may resume discovery on the first Microsoft SQL Server instance 616. The Disable action configures a process to be unavailable so that it cannot be started. The process remains disabled until it is enabled. For example, the Disable action may disable reconciliation on the first Microsoft SQL Server instance 616. The Enable action configures a disabled process to be able to start. For example, the Enable action may enable reconciliation on the first Microsoft SQL Server instance 616.

Performance Management verbs are used to analyze the current or predicted health of the Server Fabric 608 in terms of the current utilization of Server Fabric resources. These verbs also provide the means to govern the usage of resources by various containers and elements within the Server Fabric 608. The performance management verbs may include a measure action, a monitor action, a predict action, and a govern action.

The Measure action collects performance statistics related to a resource, element, or container. For example, the Measure action may measure the space used by database file Finance.mdb on Volume E of first server 636. The Monitor action evaluates performance statistics related to a resource, element, or container with respect to a policy. For example, the Monitor action may monitor the space used by database file Finance.mdb on Volume E of first server 636 for occurrences when utilization exceeds 80% of capacity. The Predict action forecasts performance statistics for a container, element, or resource as a function of historical data, resource changes, or Server Fabric actions such as deploy or create. For example, the Predict action may predict when additional storage will be needed to accommodate the Finance DAC growth. As a further example, the Predict action predicts when additional resources will be needed to accommodate overall Server Fabric growth. The Govern action specifies the minimum or maximum amount of resource allocated to a container or element. For example, the Govern action may restrict CPU utilization of first Microsoft SQL Server instance 616 to 50% of the CPU capacity of the second server 638.

Mapping verbs provide a simple means of managing relationships between the layers within the Server Fabric 608. Mapping verbs are primarily used to establish relationships between two adjacent layers. Not all relationships are managed using verbs. For example the relationship between a computer and its storage is controlled by physically manipulating the computer. The mapping verbs may include a map action and an unmap action. Conceptually, these verbs can also be thought of as top-level actions that can be taken against the Server Fabric 608 which result in a series of other lifecycle actions being executed. For example, mapping a DAC to an instance of Microsoft SQL Server tells the system that the DAC should be available on that instance. This would invoke all of the verbs, such as deploy or install, that are required to make that DAC available on the specified instance.

The Map action creates a relationship between containers, elements, or resources. For example, the Map action may join the first DAC 622 to the first Microsoft SQL Server instance 616. The Unmap action removes a mapping between containers, elements, or resources. For example, the Unmap action may split the first DAC 622 from the first Microsoft SQL Server instance 616.

Reconciliation is a process for identifying entities in the Server Fabric that have drifted from their prescribed definitions. For example, reconciliation detects if the definition of a table in a production server has been changed from how it was defined in the DAC. Three Server Fabric verbs implement reconciliation. The reconciliation verbs may include a discover action, a compare action, and a merge action.

The Discover action defines an operation in which new items are found and given a productive insight. For example, the Discover action may discover a new column in an Employee table in the first Microsoft SQL Server instance 616. The Compare action matches the current configuration of a container, element, or resource with a pre-defined configuration, and reports any differences. For example, the Compare action may compare the Employee table that exists on the first Microsoft SQL Server instance 616 against the table definition in the DAC, and finds that the version of the table in the first Microsoft SQL Server instance 616 that has a column not defined in the DAC. The Merge action creates a single configuration of a container, element, or resource from multiple instances. For example, the Merge action may merge the definition of the new column in the Employee table into the DAC definition.

Access verbs provide a means of controlling access to parts of the Server Fabric model to support long-running processes. For example, a process moving a file from one volume to another must control access to the destination volume so that multiple processes do not make conflicting space allocations. Security verbs limit access to the containers and elements within the Server Fabric 608 to authorized users. The present disclosure does not provide a new authorization infrastructure but rather these verbs represent a unified interface for authorization configuration across the Server Fabric 608. The present disclosure then leverages the various underlying authorization mechanisms already in place in Microsoft SQL Server. The Access and Security verbs may include a block action, an unblock action, a grant action, and a revoke action.

The Block action provides the issuing process exclusive access to the configuration of a container, element, or resource, and prevents other processes from accessing the configuration. This verb acts on the data within the model of the Server Fabric 608, not the actual entity itself. For example, the Block action may block access to storage volume E of first server 636 so that space can be reserved to perform a file migration. The Unblock action releases exclusive access to the configuration of a container, element or resource. This verb acts on the data within the model of the Server Fabric 608, not the actual entity itself. For example, after file migration is complete, the Unblock action may unblock access to storage volume E of the first server 636. The Grant action gives a principal permission to access a container, element, or resource. For example, the Grant action may grant principal Janet write access to the DAC. The Revoke action denies a principal permission to access a container or element. For example, the Revoke action may revoke write access to the DAC from principal Janet.

Figure 7:
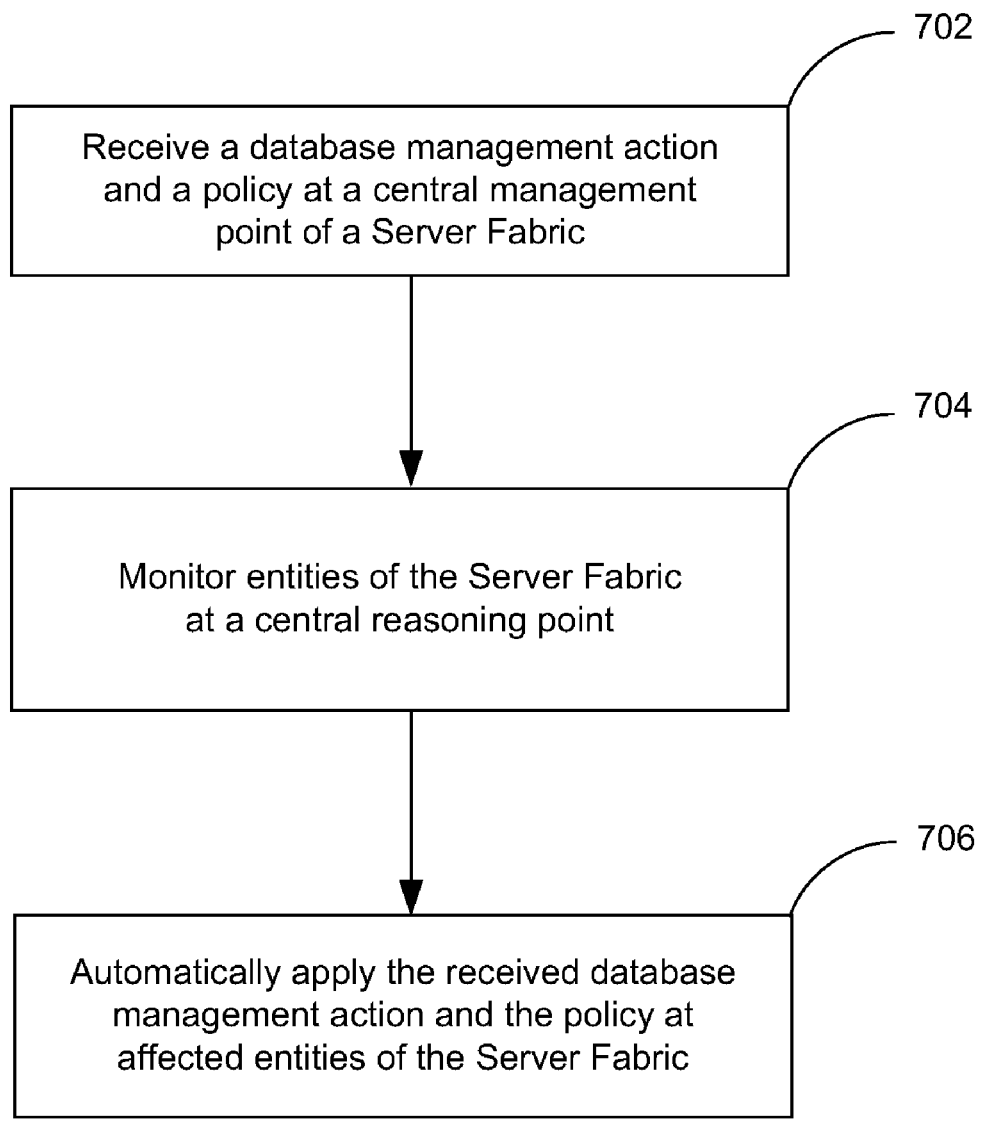
FIG. 7 is a flow diagram that illustrates a method of applying a database management action and a policy at entities of a server fabric.

Referring to FIG. 7, a particular embodiment of a method of automatically applying a database management action and a policy is illustrated. At 702, the method includes receiving a database management action and a policy at a central management point of a SQL Server Fabric (e.g., the central management point 602 of Server Fabric 608 in FIG. 6). The SQL Server Fabric identifies DACs, database runtime resources hosting the set of DACs, and computing resources used by the database runtime resources to host the DACs. Each of the DACs includes a logical representation of a collection of database elements. Moving to 704, the method also includes monitoring entities of the SQL Server Fabric at a central reasoning point (e.g., the central reasoning point 604 of Server Fabric 608 in FIG. 6). Moving to 706, the method also includes automatically applying the received database management action and the policy at affected entities identified by the Server Fabric (e.g., using Central Policies 606 in FIG. 6).

Figure 8:
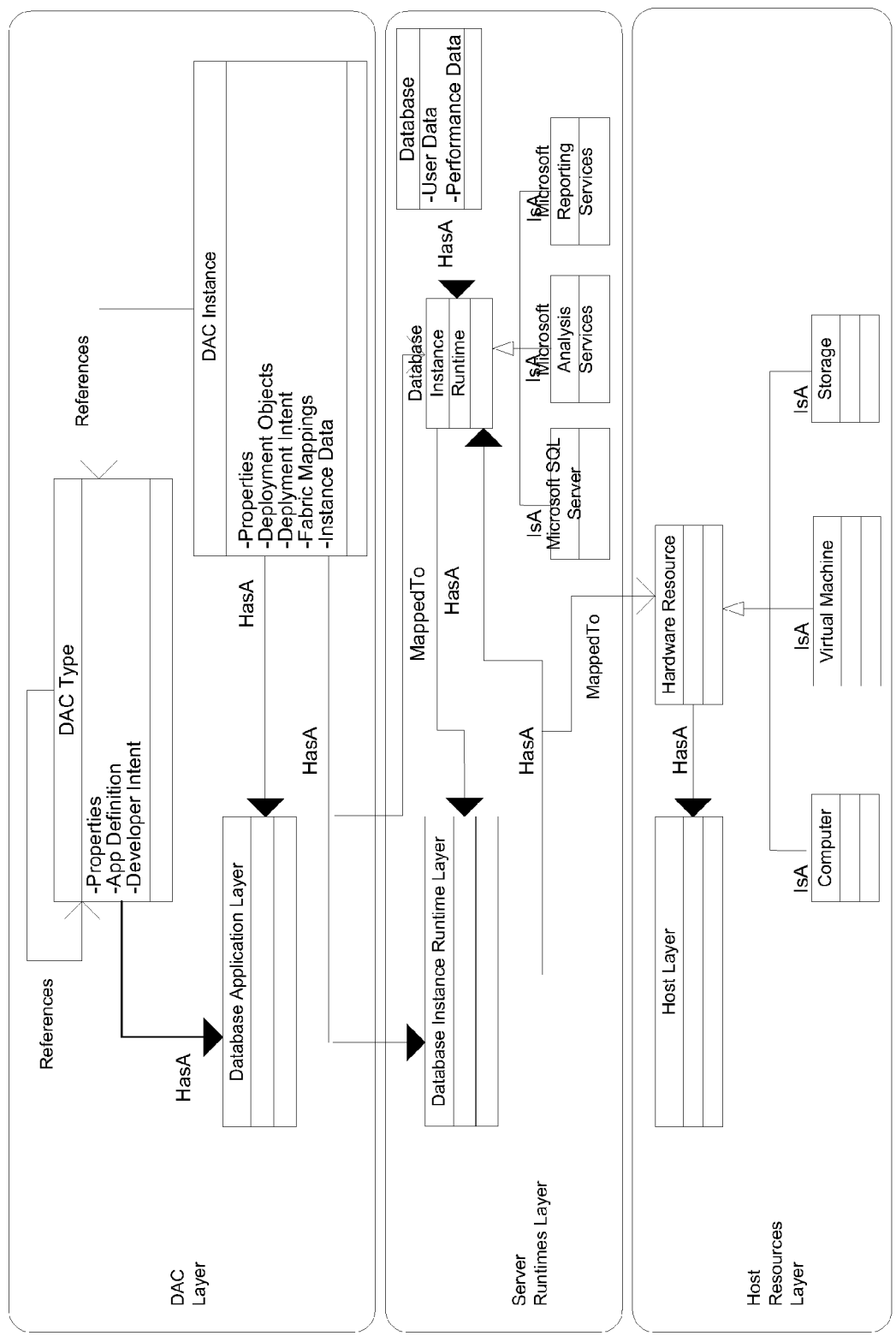
FIG. 8 is a flow diagram that illustrates entity relationships of a server fabric.

Referring to FIG. 8, an entity relationship diagram (ERD) illustrates how the Server Fabric represents a model that describes the components of the data-tier and how they are related. The entity relationship diagram (ERD) in FIG. 8 illustrates how this model takes shape to support the structure and semantics of the three layers of the Server Fabric.

Each layer is represented as a formal entity within the model, as are the containers, elements, and resources. The model also defines the relationship semantics between these entities resulting in the defined structure of the Server Fabric. This structure facilitates the mechanisms described in the next section by enabling embodiments of the present disclosure to reason over and take actions on the Server Fabric.

Figure 9:
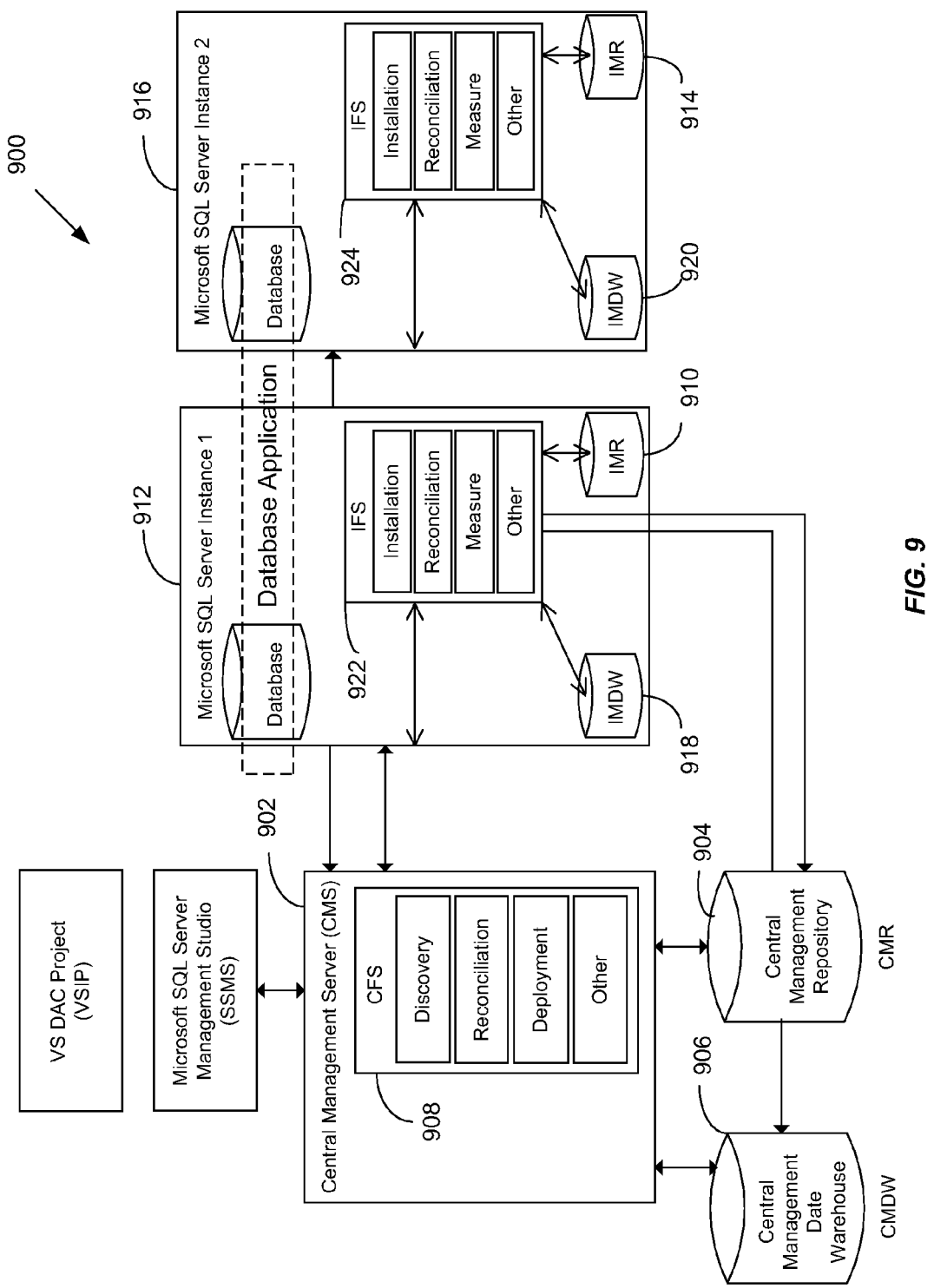
FIG. 9 is a block diagram of an embodiment of a system that manages database applications.

Referring to FIG. 9, a particular illustrative embodiment of a system is illustrated, at 900. The Central Management Server (CMS) 902 provides the Server Fabric with a centralized management point. The CMS 902 connects to a Central Management Repository (CMR) 904. Managed instances of database instances (e.g., Microsoft SQL Server) in the Server Fabric connect to the CMS 902 and upload information into the CMR 904. The CMS 902 provides actions to discover SQL Service instances on the network, provision DACs, place DAC elements in desired locations, check DACs against criterion, and reconcile differences between elements in the Server Fabric.

The CMR 904 contains a model (e.g., all relevant details, relationships, and constraints) of the Server Fabric. The CMS 902 is the central reasoning point for deployment analysis, impact analysis, and what-if analysis and contains core, detailed, and linked data types. Two of the types represent data contained in the CMR 904 with the classification based on the frequency of replication from the IMRs (e.g., IMR 910 and 914) to the CMR 904. Frequently-replicated data is referred to as core data. Less frequently-replicated data is referred to as detailed data. Linked data types serve as indexes or pointers to data which is not stored in the CMR 904.

A Central Management Data Warehouse (CMDW) 906 enables centralized reporting of historical performance statistics across a set of physical servers and instances. Data residing on each managed SQL Server runtime instance is collected and uploaded to the location of the CMDW 906 database for monitoring and reporting purposes.

A Central Fabric Service (CFS) 908 provides APIs for the core CMS 902 actions. These actions include discovery of SQL Service instances on the network, provisioning of DACs, placement of DAC elements in desired locations, checking DACs against criterion, and reconciliation of differences between elements in the Server Fabric.

An Instance Management Repository (IMR) is a database that exists within each database instance. For example, a first IMR 910 exists within a first Microsoft SQL Server Instance 912. A second IMR 914 exists within a second Microsoft SQL Server Instance 916. The IMR is the initial target of all deployments or modifications of the Server Fabric. A mechanism known as "collection set" copies the IMR information and uploads it into the CMR 904 to provide an aggregate-level view of the Server Fabric.

An Instance Management Data Warehouse (IMDW) is a management data warehouse that exists within each database instance. For example, a first IMDW 918 exists within the first Microsoft SQL Server Instance 912. A second IMDW 920 exists within the second Microsoft SQL Server Instance 916. The IMDW is the initial target of performance (e.g., reporting and/or monitoring) data for the instance, which is later uploaded into the CMDW 906 to provide an aggregate view of the Server Fabric.

An Instance Fabric Server (IFS) provides APIs for the core management actions. For example, a first IFS 922 exists within the first Microsoft SQL Server Instance 912. A second IFS 924 exists within the second Microsoft SQL Server Instance 916. These actions include validating and installing DAC Instances on the local instance, discovering installation drift, and providing reconciliation operations. The IFS may also measure the performance of the instance and carries out actions sent from the CMS 902.

Figure 10:
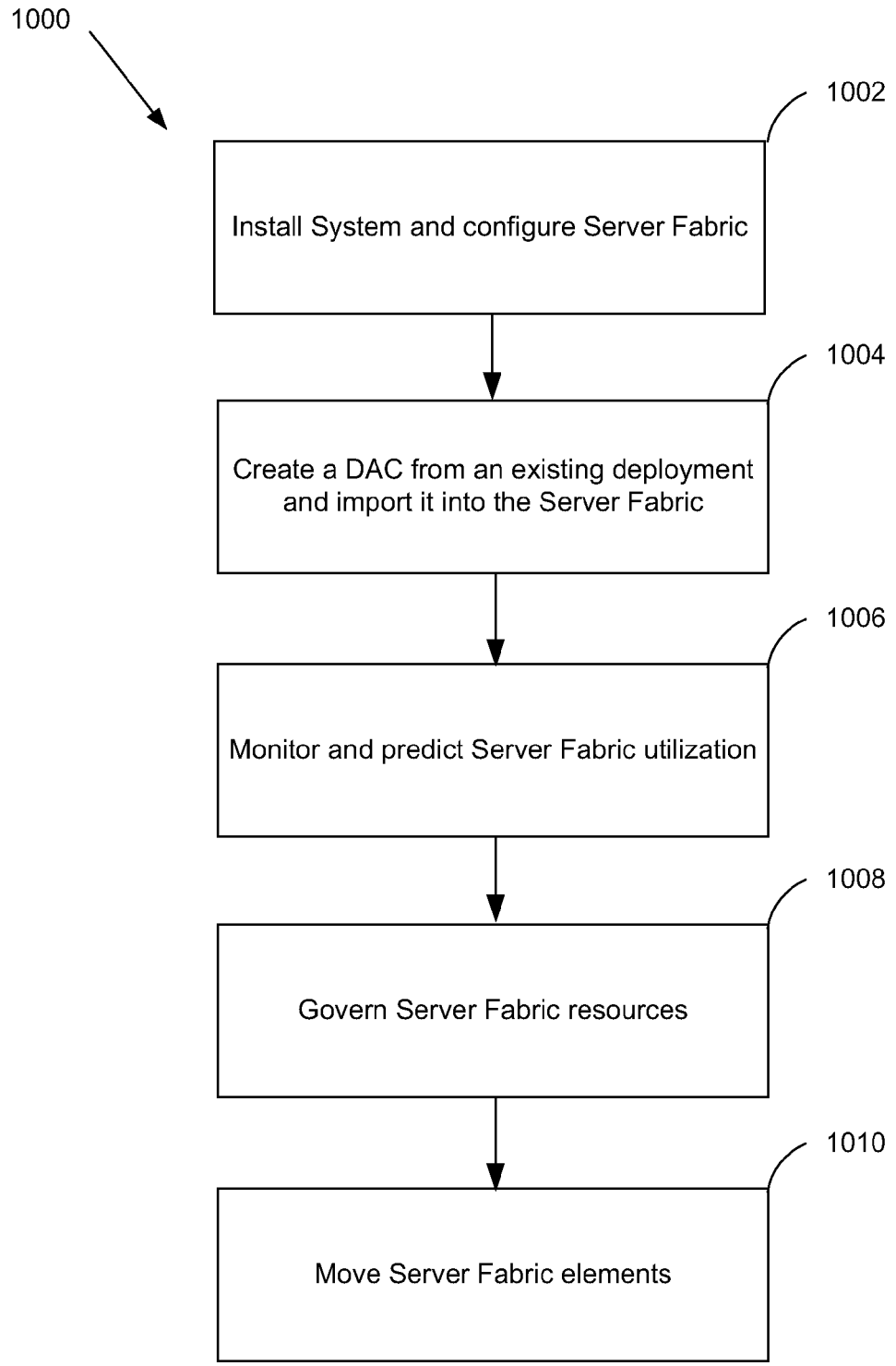
FIG. 10 is a flow diagram to illustrate a method of processing server fabric elements.

Referring to FIG. 10, an illustrative view of an end-to-end management process is illustrated, at 1000. The present disclosure provides the tools and infrastructure for managing a database application throughout the complete software lifecycle from development to deployment to operations. In this section, some canonical workflows of the present disclosure are exercised over the key architectural components described in the previous section in order to provide insight into the core design principles.

At 1002, the system is installed and the Server Fabric is configured. At 1004, a DAC is created from an existing deployment and imported into the Server Fabric. At 1006, Server Fabric utilization is monitored and predicted. Based on the monitoring and prediction, Server Fabric resources may be adjusted. For example, at 1008, Server Fabric resources are governed. At 1010, Server Fabric elements are moved.

Figure 11:
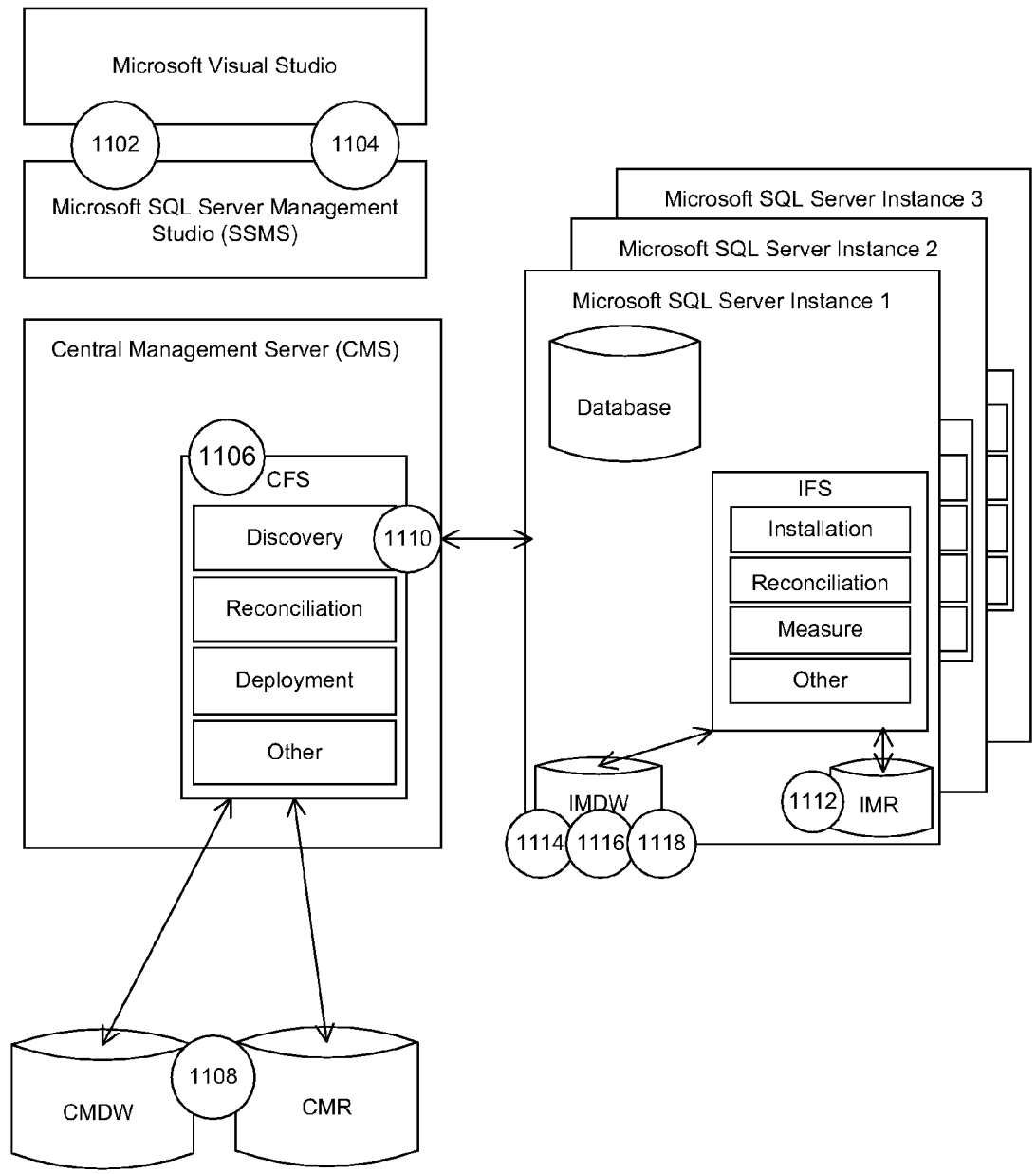
FIG. 11 is a block diagram that illustrates a first particular embodiment of a system for managing SQL instances.

Referring to FIG. 11, an illustrative example of an installation process is shown. An installation package is made up of three components: tools extensions, Server Fabric services, and management repository schemas. Tools extensions are applied to Microsoft Visual Studio or Microsoft SQL Server Management Studio, and can be extended for additional tools as well. The Server Fabric services and the management repository schemas are installed within the Central Management Server and the managed instances.

At 1102, the installation package is obtained. At 1104, tools extensions (e.g., for Microsoft Visual Studio and Microsoft SQL Server Management Studio) are installed. At 1106, the Central Management Server (CMS) and Central Fabric Service (CFS) are installed and configured. At 1108, the Central Management Repository (CMR) and Central Management Data Warehouse (CMDW) schemas are installed. At 1110, all the runtime instances are discovered, and instances that are to become managed instances in the Server Fabric are discovered. At 1112, Server Fabric installation jobs are created within each managed instance. At 1114, the Instance Management Repository (IMR) and Instance Management Data Warehouse (IMDW) schemas are installed in each managed instance. At 1116, the Server Fabric IMDW to CMDW data uploading mechanisms are installed and are started at 1118.

Figure 12:
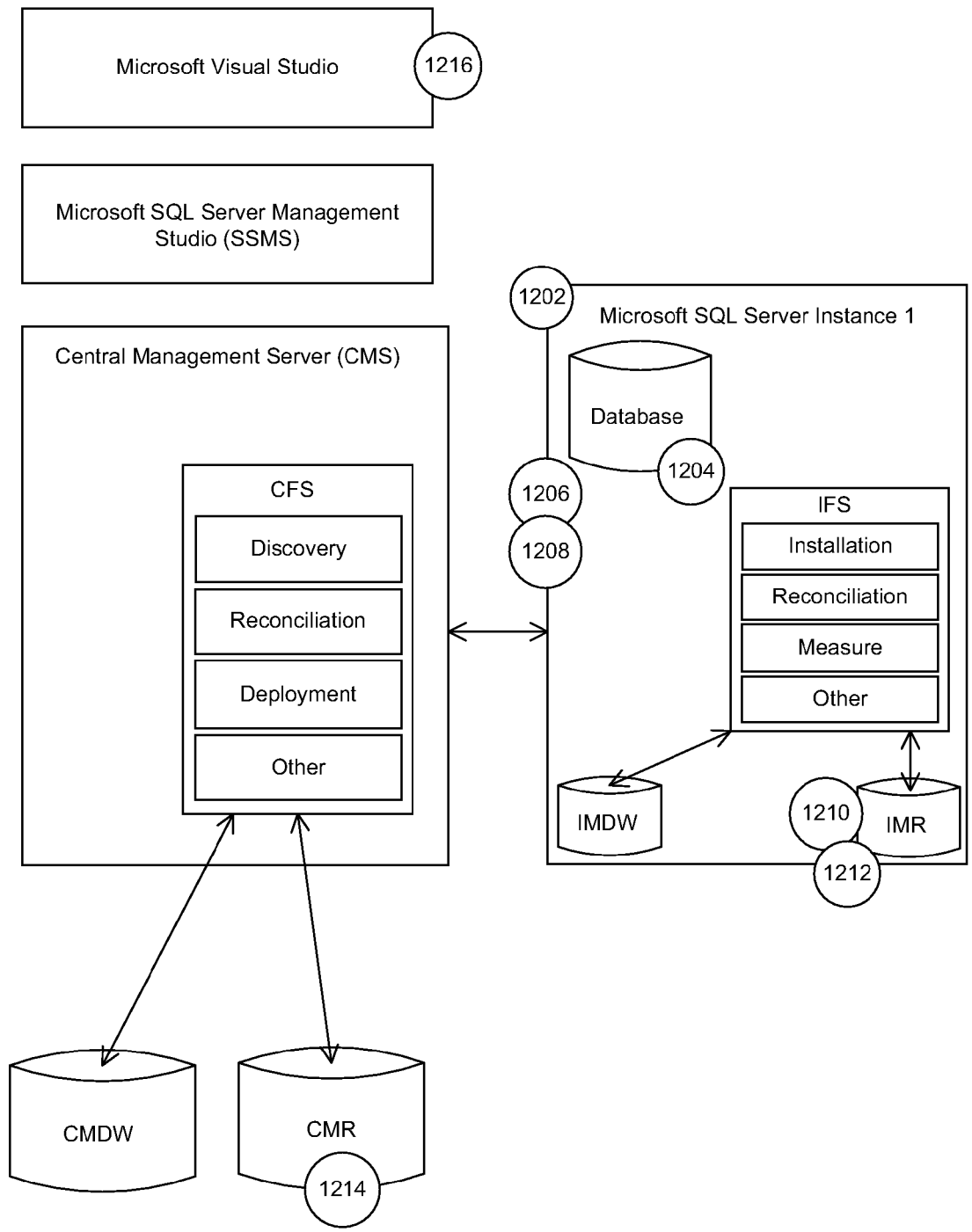
FIG. 12 is a block diagram that illustrates a second particular embodiment of a system for managing SQL instances.

Referring to FIG. 12, an illustrative example of creating a DAC from an existing deployment and importing it into the Server Fabric is shown. A DAC is the core logical unit of management within the Server Fabric. The Server Fabric manages DACs to ensure optimal resource utilization. DACs are authored within either Microsoft Visual Studio or Microsoft SQL Server Management studio by creating a new DAC Project. In addition, a new DAC can be reverse-engineered from a previous database deployment by selecting application database objects.

At 1202, a DAC is created. At 1204, instance objects are added to the DAC. At 1206, instance settings and policies are added to the DAC. At 1208, deployment settings and policies are added to the DAC. At 1210, the DAC settings and policies are validated against the IMR. At 1212, the DAC is saved to the IMR. At 1214, the DAC is copied from the IMR to the CMR. Optionally, at 1216, a DAC package binary file is created for later development use in Visual Studio.

Figure 13:
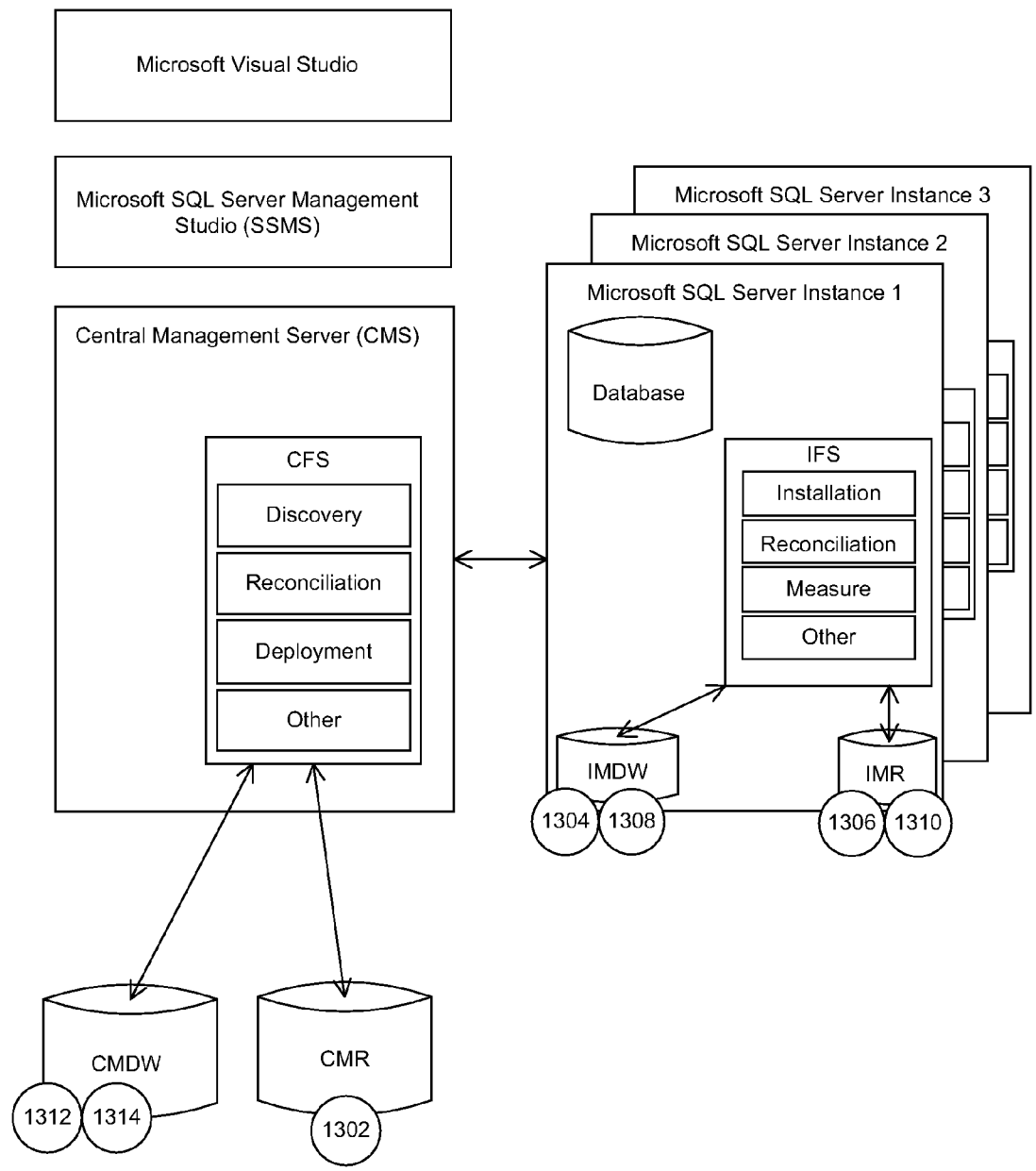
FIG. 13 is a block diagram that illustrates a third particular embodiment of a system for managing SQL instances.

Referring to FIG. 13, an illustrative example of monitoring and predicting Server Fabric utilization is shown. Resource utilization policies can be set and evaluated across the Server Fabric and the DACs to avoid over-utilization and under-utilization of resources.

At 1302, the global resource monitoring policies are set in the CMR. At 1304, statistics are added to the IMDW. At 1306, the database resource monitoring policy is set in the IMR. At 1308, resource utilization statistics are monitored in the IMDW. At 1310, IMDW resource utilization statistics are exported to the CMDW. At 1312, current resource utilization is monitored in the CMDW. At 1314, predicted resource utilization is monitored in the CMDW.

Figure 14:
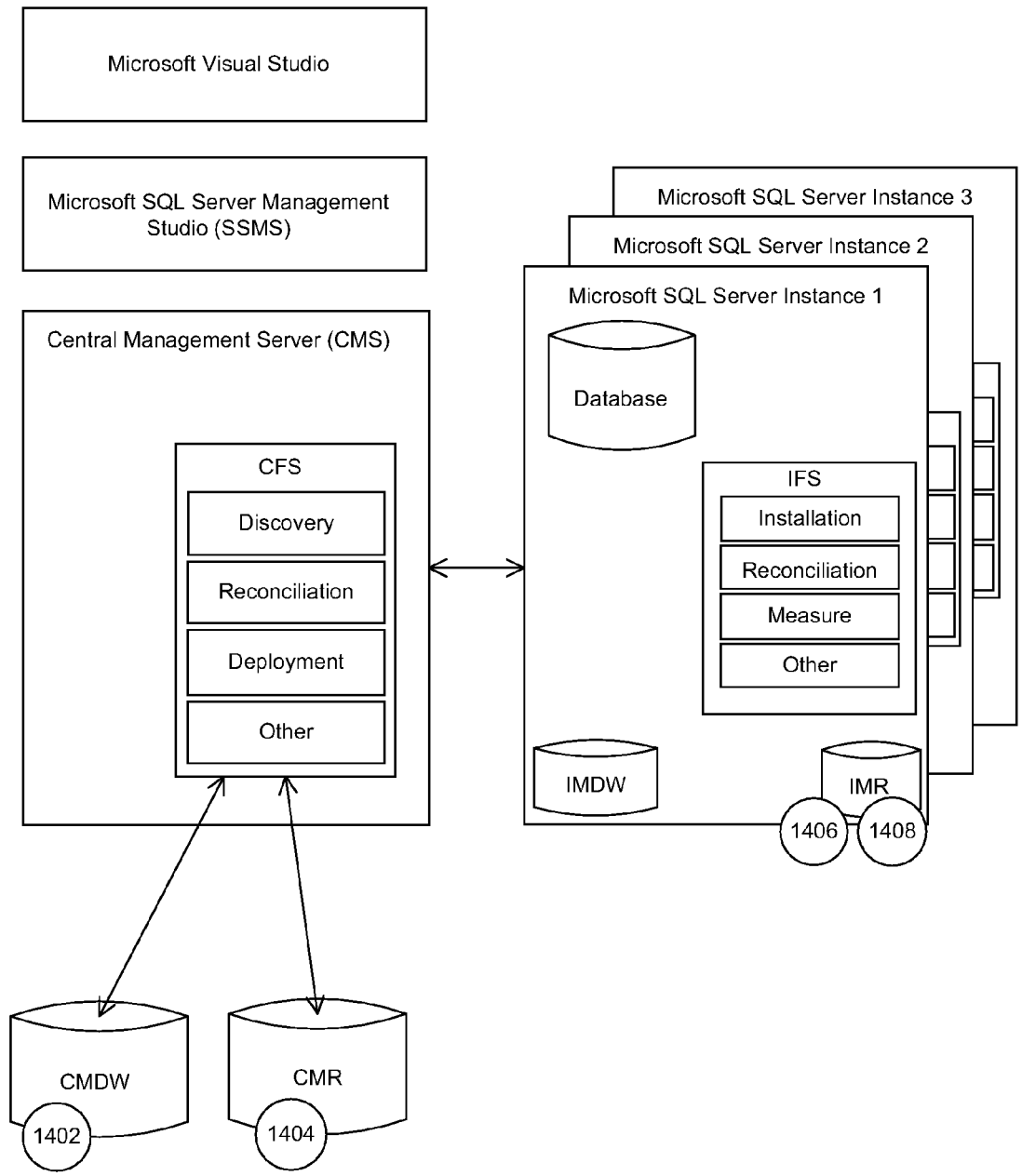
FIG. 14 is a block diagram that illustrates a fourth particular embodiment of a system for managing SQL instances.

Referring to FIG. 14, an illustrative example of adjusting Server Fabric resources is shown. Resource allocation policies can be set and evaluated across the Server Fabric and the DACs to balance the resources available to DACs. Adjusting resources can be accomplished through actions such as in-place resource governing and moving Server Fabric elements, such as moving files between volumes or moving Database Applications between servers. Server Fabric resources can be adjusted by implementing new resource governing policies.

At 1402, resource balancing options are predicted for DACs related to the target DAC. At 1404, new resource policies are set in the CMR. At 1406, the new resource policies are copied to each IMR. At 1408, resource governing rules are implemented in each IMR.

Figure 15:
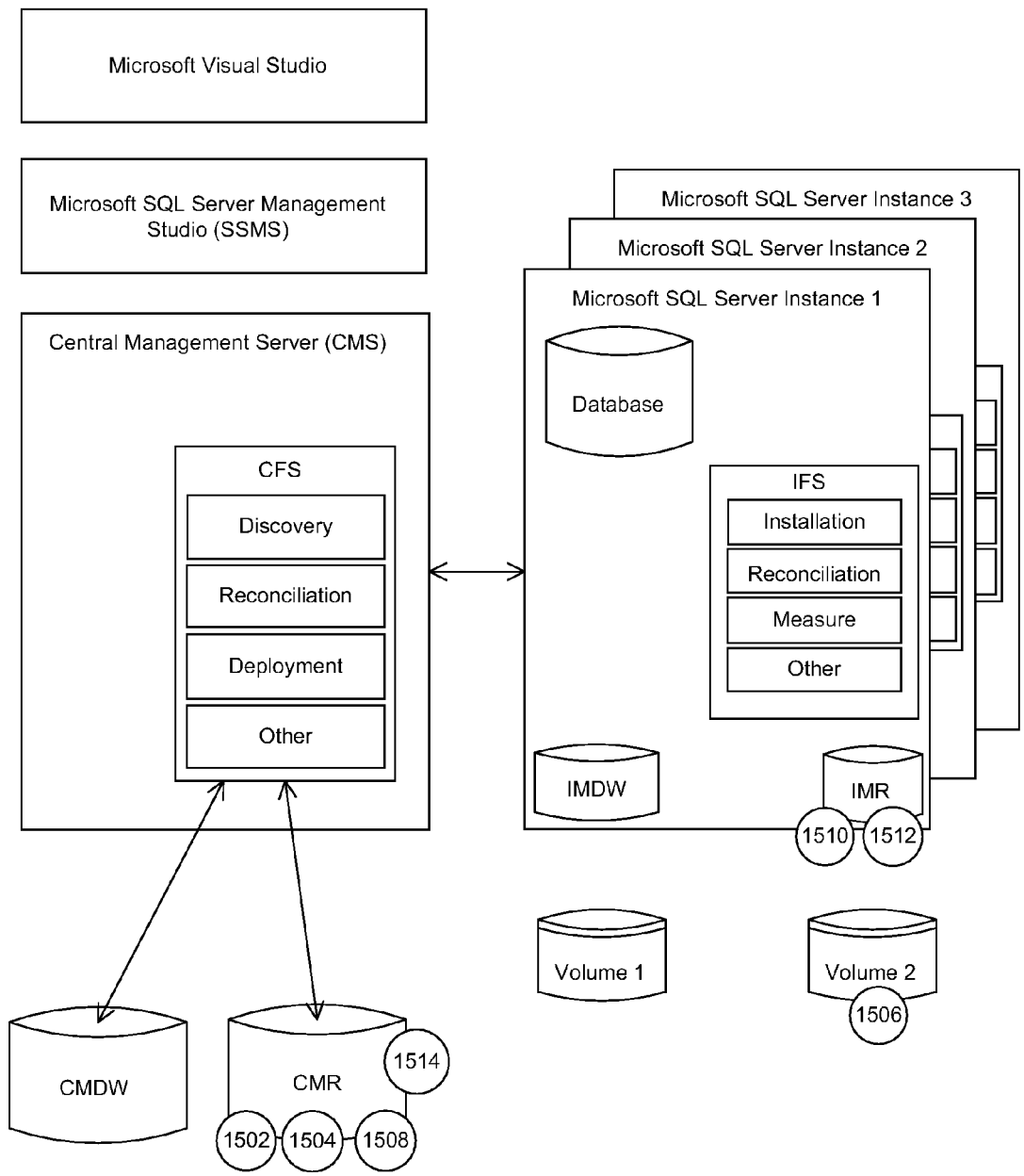
FIG. 15 is a block diagram that illustrates a fifth particular embodiment of a system for managing SQL instances.

Referring to FIG. 15, another illustrative example of adjusting Server Fabric resources is shown. In FIG. 15, the process of moving a DAC from one file to another is illustrated.

At 1502, a DAC is obtained from the CMR. At 1504, potential target volumes are predicted. At 1506, the DAC is mapped to another volume (volume 2). At 1508, the DAC is copied from the CMR to the IMR. At 1510, the DAC is validated in the IMR. At 1512, the DAC is installed (alter database, copy file . . . ). At 1514, the DAC is validated in the CMR.

Figure 16:
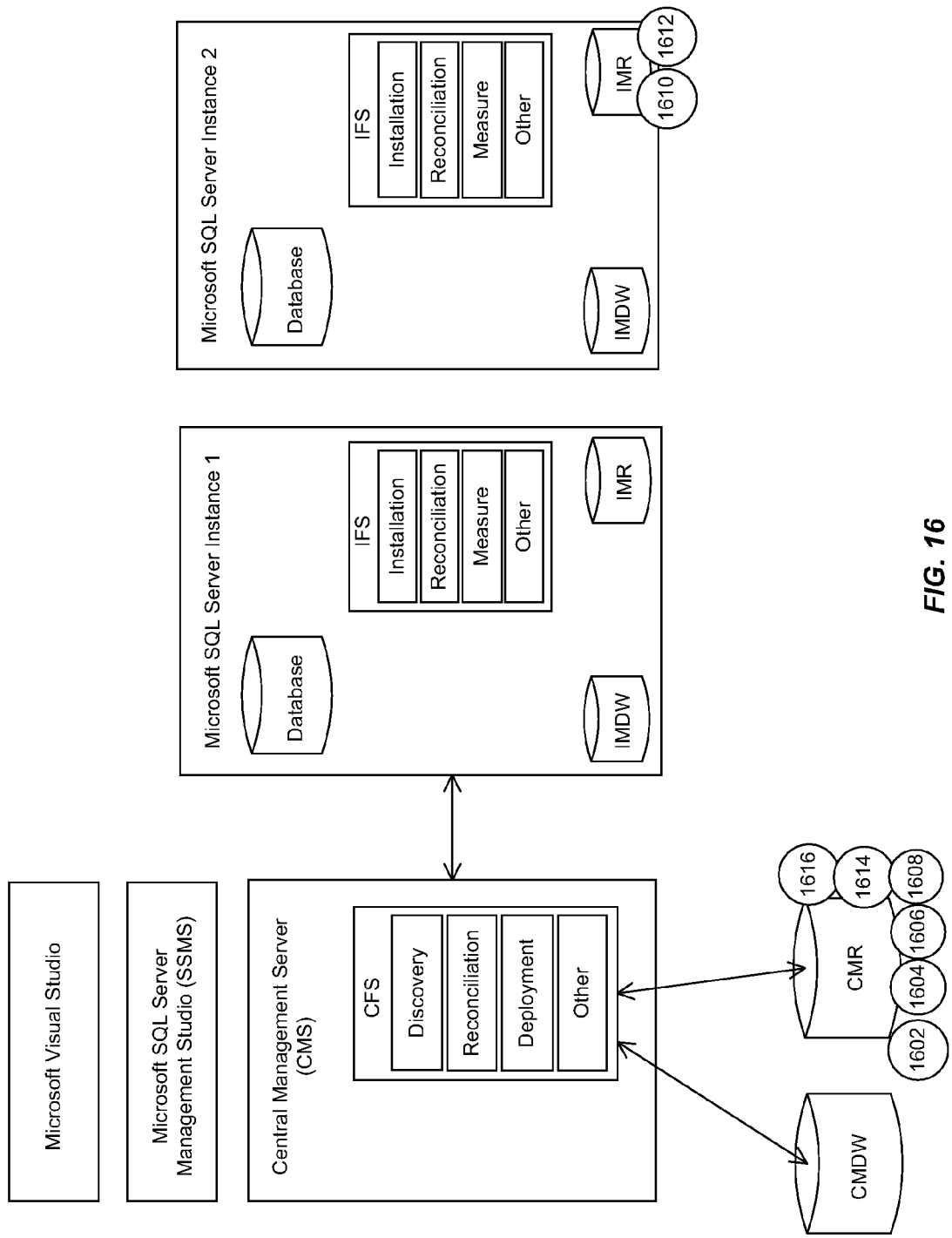
FIG. 16 is a block diagram that illustrates a sixth particular embodiment of a system for managing SQL instances.

Referring to FIG. 16, another illustrative example of adjusting Server Fabric resources is shown. In FIG. 16, the process of moving a DAC from one instance of Microsoft SQL Server to another is illustrated.

At 1602, the DAC is obtained from the CMR. At 1604, potential target instances are predicted. At 1606, the DAC is mapped to runtime Instance 2. At 1608, the DAC is copied from the CMR to the Instance 2 IMR. At 1610, the DAC is validated in the Instance 2 IMR. At 1612, the DAC is installed into the Instance 2 IMR. At 1614, the DAC endpoint name is moved in the CMR. At 1616, the DAC is validated in the CMR.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer readable medium storing computer-executable instructions that, when executed by at least one processor, perform a method for deploying a data-tier application component (DAC), the method comprising:
   creating a compilable DAC model that contains a collection of database elements, wherein the collection of database elements comprises:
      metadata related to one or more database objects, wherein the metadata related to the one or more database objects includes an identifier of each of the database objects,
      a database runtime resource identifier of a database runtime resource operable to manipulate the database objects, and
      a policy related to execution of the database runtime resource;
   building a DAC package based on the compilable DAC model, wherein the building of the DAC package comprises compiling the compilable DAC model;
   importing a plurality of DAC types from the DAC package into a Server Fabric, wherein each of the plurality of DAC types define a logical implementation of the DAC, and wherein the Server Fabric models, using central policies and at least one central reasoning point, at least one DAC, one or more database server runtimes, and at least one hardware resource; and
   deploying one DAC type from the plurality of DAC types to the one or more database server runtimes in the Server Fabric to create a DAC instance, wherein creation of the DAC instance includes capturing information comprising at least:
      two or more properties for the DAC instance, including a unique identifier property and a deployment name property; and
      a deployment schema that defines objects specific to the deployment.

2. The computer readable medium of claim 1, wherein the data-tier application component type includes at least properties, an application schema, and a developer policy.

3. The computer readable medium of claim 2, wherein the data-tier application component type provides a mechanism for a user to define invariants, requirements, and an intended usage of the data-tier application component.

4. The computer readable medium of claim 1, wherein the data-tier application component instance further comprises a deployment policy, a fabric mapping, and data.

5. A computer-implemented system for associating database elements with a set of supporting computer resources, comprising:
   at least one processor;
   a memory, the memory comprising computer-executable instructions that when executed by the at least one processor, perform a method for deploying a data-tier application component (DAC), the method comprising:

creating a compilable DAC model that contains a collection of database elements, wherein the collection of database elements comprises:
  metadata related to one or more database objects, wherein the metadata related to the one or more database objects includes an identifier of each of the database objects,
  a database runtime resource identifier of a database runtime resource operable to manipulate the database objects, and
  a policy related to execution of the database runtime resource;
building a DAC package based on the DAC model, wherein the building of the DAC package comprises compiling the DAC model;
importing a plurality of DAC types from the DAC package into a Server Fabric, wherein each of the plurality of DAC types define a logical implementation of the DAC, and wherein the Server Fabric models, using central policies and at least one central reasoning point, at least one DAC, one or more database server runtimes, and at least one hardware resource; and
deploying one DAC type from the plurality of DAC types to the one or more database server runtimes in the Server Fabric to create a DAC instance, wherein creation of the DAC instance includes capturing information comprising at least:
  two or more properties for the DAC instance, including a unique identifier property and a deployment name property; and
  a deployment schema that defines objects specific to the deployment.

6. The system of claim 5, wherein the data-tier application component name is unchanged while one or more database elements in the collection of database elements are modified.

7. The system of claim 5, wherein the collection of database elements or one or more runtime resources may change, and wherein a data-tier application component name associated with the collection of database elements is unchanged so that application connection strings of one or more database applications do not need to be recoded in response to a change to the collection of database elements.

8. The system of claim 7, wherein the database applications using the data-tier application component name are located on different networked computers.

9. The system of claim 5, wherein the policy related to execution of the database runtime resource is applied to a data-tier application component name associated with the collection of database elements, and wherein the policy continues to be applied when the collection of database elements, or one or more runtime resources is changed.

10. The system of claim 5, further comprising an API to interface with the collection of database elements, wherein the API enables measurement of utilization of one or more elements in the collection of database elements.

11. A method of deploying a data-tier application component (DAC), the method comprising:
  creating a compilable DAC model that contains a collection of database elements, wherein the collection of database elements comprises:
    metadata related to one or more database objects, wherein the metadata related to the one or more database objects includes an identifier of each of the database objects,
    a database runtime resource identifier of a database runtime resource operable to manipulate the database objects, and
    a policy related to execution of the database runtime resource;
  building a DAC package based on the DAC model, wherein the building of the DAC package comprises compiling the DAC model;
  importing a plurality of DAC types from the DAC package into a Server Fabric, wherein each of the plurality of DAC types define a logical implementation of the DAC, and wherein the Server Fabric models, using central policies and at least one central reasoning point, at least one DAC, one or more database server runtimes, and at least one hardware resource; and
  deploying one DAC type from the plurality of DAC types to the one or more database server runtimes in the Server Fabric to create a DAC instance, wherein creation of the DAC instance includes capturing information comprising at least:
    two or more properties for the DAC instance, including a unique identifier property and a deployment name property; and
    a deployment schema that defines objects specific to the deployment.

12. The method of claim 11, further comprising saving a representation of the DAC model as a DAC project and checking in the DAC project into a source control system or a source control database to store the DAC project.

13. The method of claim 11, further comprising editing the DAC model and validating the DAC model before building the DAC package, configuring the DAC type before deploying the DAC instance, and installing the DAC instance with respect to a specific set of physical computing resources.

14. The method of claim 11, wherein the single unit of management is mapped to a first physical computing resource.

15. The method of claim 14, wherein the first physical computing resource includes one or more of a processor, a memory storage device, a physical storage device, a hard disk, a compact disk, a hard drive, and a register.

16. The method of claim 14, wherein the single unit of management is remapped from the first physical computing resource to a second physical computing resource.

17. The method of claim 11, wherein the policy related to execution of the database runtime resource is a resource limitation policy or a procedure related to software or hardware resource requirements.

18. The method of claim 11, wherein the single unit of management is identified by an associated data-tier application component name, wherein the data-tier application component name is accessible for use by a database application.

19. The method of claim 11, wherein the database object includes one or more of a schema, a table, a view, a stored procedure, a function, a trigger, a data type, an index, a login, a user, a permission, a policy, statistics, a primary key, a foreign key, a default, and a check constraint.

20. The method of claim 11, wherein the single unit of management includes a data-tier application component type and a data-tier application component instance, and wherein the data-tier application component type includes at least properties, an application schema, and a developer policy.

21. The method of claim 20, wherein the data-tier application component type provides a mechanism for a user to define invariants, requirements, and an intended usage of the data-tier application component.

22. The method of claim 20, wherein the data-tier application component instance includes properties, deployment schema, a deployment policy, a fabric mapping, and data.

* * * * *